US012598375B2

(12) United States Patent

Haruna et al.

(10) Patent No.: US 12,598,375 B2

(45) Date of Patent: Apr. 7, 2026

(54) REMOTE CONTROL DEVICE

(71) Applicant: Mitsubishi Electric Corporation, Tokyo (JP)

(72) Inventors: Masaki Haruna, Tokyo (JP); Yoshihiro Morimoto, Tokyo (JP); Aki Minegishi, Tokyo (JP); Tomoki Emmei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 404 days.

(21) Appl. No.: 18/019,101

(22) PCT Filed: Apr. 19, 2021

(86) PCT No.: PCT/JP2021/015911

§ 371 (c)(1),
(2) Date: Feb. 1, 2023

(87) PCT Pub. No.: WO2022/030047

PCT Pub. Date: Feb. 10, 2022

(65) Prior Publication Data

US 2023/0292000 A1 Sep. 14, 2023

(30) Foreign Application Priority Data

Aug. 3, 2020 (JP) ................................ 2020-131900

(51) Int. Cl.
*H04N 23/66* (2023.01)
*G05B 19/409* (2006.01)
*G06T 11/00* (2006.01)
(52) U.S. Cl.
CPC ........... *H04N 23/66* (2023.01); *G05B 19/409* (2013.01); *G06T 11/00* (2013.01); *G05B 2219/35438* (2013.01)

(58) Field of Classification Search
CPC .................. H04N 23/66; G05B 19/409; G05B 2219/35438; G06T 11/00
See application file for complete search history.

(56) References Cited

U.S. PATENT DOCUMENTS

| | | | |
|---|---|---|---|
| 7,298,385 | B2 | 11/2007 | Kazi et al. |
| 10,137,575 | B2 | 11/2018 | Itkowitz et al. |

(Continued)

FOREIGN PATENT DOCUMENTS

| | | |
|---|---|---|
| CN | 104057448 A | 9/2014 |
| CN | 105407828 A | 3/2016 |

(Continued)

OTHER PUBLICATIONS

Office Action issued Jul. 18, 2023 in Japanese Patent Application No. 2021-559199, 15 pages.

(Continued)

*Primary Examiner* — Jay Khandpur

(74) *Attorney, Agent, or Firm* — XSENSUS LLP

(57) ABSTRACT

A remote control device is a remote control device for an operator to remotely control a real machine, and includes: a limitation unit that sets a movable range of the real machine on the basis of limitation information from the operator; a control unit that generates first command information that is input information for operating the real machine on the basis of control information from the operator and the movable range; and a video display unit that displays a real machine video that is a video of the real machine and a movable information video that is a video of the movable range corresponding to the real machine.

19 Claims, 26 Drawing Sheets

(56) References Cited

U.S. PATENT DOCUMENTS

| | | | |
|---|---|---|---|
| 10,737,394 B2 | 8/2020 | Itkowitz et al. | |
| 10,842,577 B2 | 11/2020 | Kilroy et al. | |
| 2002/0029610 A1* | 3/2002 | Chrystall | A43D 999/00 73/7 |
| 2006/0244381 A1* | 11/2006 | Kim | H01J 11/24 313/586 |
| 2009/0192524 A1 | 7/2009 | Itkowitz et al. | |
| 2012/0290132 A1 | 11/2012 | Kokubo et al. | |
| 2013/0230293 A1* | 9/2013 | Boyle | H04N 23/66 386/224 |
| 2014/0288706 A1 | 9/2014 | Asahi et al. | |
| 2015/0285721 A1* | 10/2015 | Watanabe | G01N 3/08 73/788 |
| 2017/0282372 A1 | 10/2017 | Itkowitz et al. | |
| 2018/0213146 A1* | 7/2018 | Chen | H04N 23/66 |
| 2020/0117279 A1* | 4/2020 | Hobbs | H04N 23/50 |
| 2020/0214779 A1 | 7/2020 | Masuda et al. | |
| 2020/0238536 A1* | 7/2020 | Okamoto | B25J 13/00 |
| 2020/0368915 A1 | 11/2020 | Itkowitz et al. | |
| 2023/0362485 A1* | 11/2023 | Kim | G06T 3/40 |

FOREIGN PATENT DOCUMENTS

| | | | | |
|---|---|---|---|---|
| CN | 105632293 A | * | 6/2016 | G09B 19/167 |
| CN | 105636542 A | | 6/2016 | |
| CN | 104423370 B | * | 1/2018 | G05B 19/4185 |
| JP | H11-347983 A | | 12/1999 | |
| JP | 2004-223128 A | | 8/2004 | |
| JP | 2004-243516 A | | 9/2004 | |
| JP | 2006-113858 A | | 4/2006 | |
| JP | 2007-029232 A | | 2/2007 | |
| JP | 2010-61346 A | | 3/2010 | |
| JP | 2011-245614 A | | 12/2011 | |
| JP | 2012-236244 A | | 12/2012 | |
| JP | 2014-180723 A | | 9/2014 | |
| JP | 2016-101506 A | | 6/2016 | |
| JP | 2016-531008 A | | 10/2016 | |
| JP | 2016-538894 A | | 12/2016 | |
| JP | 2017-13206 A | | 1/2017 | |
| JP | 2018-513711 A | | 5/2018 | |
| JP | 2020-75354 A | | 5/2020 | |
| WO | 2019/012812 A1 | | 1/2019 | |
| WO | 2022/030047 A1 | | 2/2022 | |

OTHER PUBLICATIONS

Office Action issued Dec. 19, 2023 in Japanese Patent Application No. 2022-126408, 4 pages.

Extended European Search Report issued Jan. 3, 2024 in European Patent Application No. 21853723.1, 9 pages.

Thurston L. Brooks, et al., "Operator Vision Aids for Telerobotic Assembly and Servicing in Space", Proceedings of the 1992 IEEE International Conference on Robotics and Automation, May 12-14, 1992, 7 pages, XP000300570.

Office Action issued Apr. 18, 2023 in Japanese Patent Application No. 2021-559199 with a computer-generated 1 English translation thereof, 20 pages.

International Search Report and Written Opinion mailed on Jul. 6, 2021, received for PCT Application PCT/JP2021/015911, filed on Apr. 19, 2021, 13 pages including English Translation.

Notification of reasons for refusal mailed on Jan. 18, 2022, received for JP Application 2021-559199, 16 pages Including English Translation.

Decision of refusal mailed on May 10, 2022, received for JP Application 2021-559199, 13 pages including English Translation.

Office Action issued Jul. 4, 2023 in Japanese Patent Application No. 2022-126408 with English machine translation thereof, 13 pages.

Office Action mailed on Mar. 27, 2025 for corresponding Chinese patent application No. 202180058187.9 (14 pgs).

Office Action mailed on Aug. 30, 2025 for corresponding Chinese Patent Application No. 202180058187.9.

Decision of Refusal mailed Jan. 27, 2026 in Chinese Application No. 202180058187.9 (17 pgs).

European communication regarding third party observations, including an English machine translation of the final page (EP Application No. 21853723.1, Date Mailed: Feb. 17, 2026).

Office Action mailed Oct. 13, 2025 in corresponding European Application No. 21 853 723.1. (5 pages).

* cited by examiner (a)

(b)

(a)

(b)

(a)

(b)

(a)

(b)

START

SET MOVABLE RANGE — ST1

GENERATE FIRST COMMAND INFORMATION — ST2

DISPLAY REAL MACHINE VIDEO AND MOVABLE INFORMATION VIDEO — ST5

INSTRUCT TO START REMOTE OPERATION — ST4

END (a)

(b)

REMOTE CONTROL DEVICE

CROSS-REFERENCE TO RELATED APPLICATIONS

The present application is based on PCT filing PCT/JP2021/015911, filed Apr. 19, 2021, which claims priority to JP 2020-131900, filed Aug. 3, 2020, the entire contents of each are incorporated herein by reference.

FIELD

The present disclosure relates to a remote control device for an operator to remotely control a real machine.

BACKGROUND

When an operator remotely controls a real machine, there is a difference between a behavior of the real machine predicted by the operator and an actual behavior of the real machine, which makes it difficult to predict the motion of the real machine, and thus work efficiency deteriorates.

Patent Literature 1 discloses a hyperdexterous system user interface. The system sets a movable range of a real machine in order to facilitate motion prediction of the real machine.

CITATION LIST

Patent Literature

Patent Literature 1: Japanese Translation of PCT International Application Laid-open No. 2018-513711 (pp. 10 to 12, FIG. 1)

SUMMARY

Technical Problem

Conventional control devices have a problem of an operator failing to know a movable range of a real machine, and thus work efficiency deteriorates.

The present disclosure has been made to solve the above problem. An object of the present disclosure is to provide a remote control device that improves work efficiency by setting a movable range of a real machine and presenting the set movable range to an operator.

Solution to Problem

A remote control device according to the present disclosure is a remote control device for an operator to remotely control a real machine, the remote control device comprising: a limitation unit to set a movable range of the real machine on a basis of limitation information from the operator; a control unit to generate first command information on a basis of control information from the operator and the movable range, the first command information being input information for operating the real machine; and a video display unit to display a real machine video and a movable information video, the real machine video being a video of the real machine, the movable information video being a video of the movable range corresponding to the real machine.

Advantageous Effects of Invention

According to the present disclosure, a remote control device can improve work efficiency as compared with conventional ones by setting a movable range of a real machine and presenting the set movable range to an operator.

DESCRIPTION OF EMBODIMENTS

Figure 1:
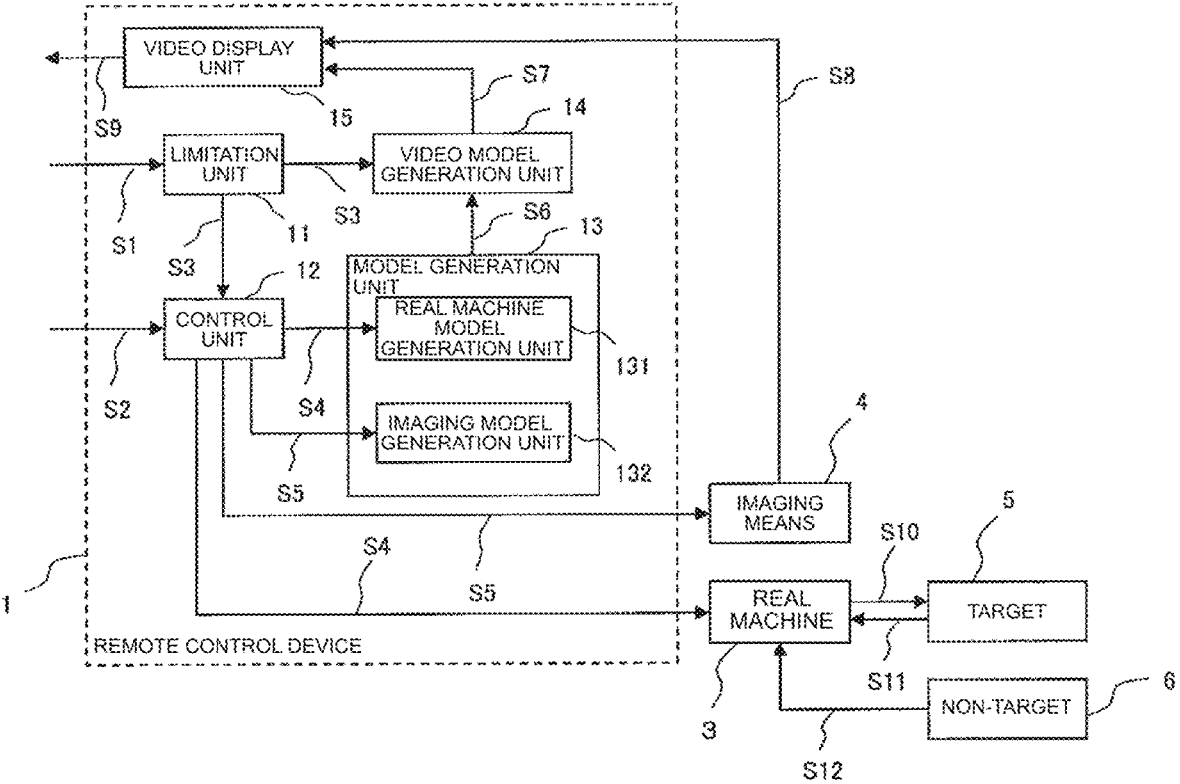
FIG. 1 is a block diagram illustrating an example of a configuration of a remote control device in a first embodiment.

Embodiments will be described with reference to the accompanying drawings. For ease of description, coordinate axes of an x-y-z Cartesian coordinate system are illustrated in the drawings. In a real machine 3, the x-y-z Cartesian coordinate system is defined by directions of arrangement of an x-axis translation mechanism 31, a y-axis translation mechanism 32, and a z-axis translation mechanism 33, which will be described later. The same direction as the direction in which the x-axis translation mechanism 31 is disposed is defined as an x-axis direction. A backward direction thereof is a +x direction, and a frontward direction thereof is a −x direction. The same direction as the direction in which the y-axis translation mechanism 32 is disposed is defined as a y-axis direction. A leftward direction thereof is a +y direction, and a rightward direction thereof is a −y direction. The same direction as the direction in which the z-axis translation mechanism 33 is disposed is defined as a z-axis direction. An upward direction thereof is a +z direction, and a downward direction thereof is a −z direction. A depth direction with respect to a control unit 12 and an operator is defined as the x-axis direction. A backward direction thereof is a +x direction, and a frontward direction thereof is a −x direction. A left-right direction with respect to the control unit 12 and the operator is defined as the y-axis direction. A leftward direction thereof is a +y direction, and a rightward direction thereof is a −y direction. An up-down direction with respect to the control unit 12 and the operator is defined as the z-axis direction. An upward direction thereof is a +z direction, and a downward direction thereof is a −z direction.

First Embodiment

FIG. 1 is a block diagram illustrating an example of a configuration of a remote control device 1 in a first embodiment. With the remote control device 1, an operator remotely controls the real machine 3 captured by an imaging means 4.

As illustrated in FIG. 1, the remote control device 1 includes a limitation unit 11, the control unit 12, a model generation unit 13, a video model generation unit 14, and a video display unit 15.

The limitation unit 11 receives limitation information S1 from the operator (not illustrated). The limitation unit 11 generates a movable range S3 on the basis of the limitation information S1, and provides the movable range S3 for the control unit 12 and the video model generation unit 14. The limitation information S1 is information on the operator-set range in which the real machine 3 is movable. The movable range S3, which is set by the operator, is a range in which the real machine 3 is movable. That is, the limitation unit 11 sets the movable range S3 of the real machine 3 on the basis of the limitation information S1 from the operator.

The control unit 12 receives control information S2 from the operator and the movable range S3 from the limitation unit 11. The control unit 12 generates first command information S4 and second command information S5 on the basis of the control information S2 and the movable range S3, provides the first command information S4 for the real machine 3 and a real machine model generation unit 131, and provides the second command information S5 for the imaging means 4 and an imaging model generation unit 132. The control information S2 is a motion command for remotely operating the real machine 3. This motion command is operation itself of a control stick 121 and a button 122 in the control unit 12, which will be described later. The first command information S4 is input information for operating the real machine 3. Specifically, the first command information S4 is information input to a driver IC, a microcomputer, etc. that moves the real machine 3. The second command information S5 is input information for operating the imaging means 4. Specifically, the second command information S5 is an image-capturing ON/OFF switching command, a magnification adjustment command, etc. for the imaging means 4. The operator, who adjusts the magnification of the imaging means 4, can operate the real machine 3, checking both an entire video of the real machine 3 and an enlarged video of the real machine 3.

The model generation unit 13 receives, from the control unit 12, the first command information S4 and the second command information S5. On the basis of these pieces of information, the model generation unit 13 generates model information S6, and provides the model information S6 for the video model generation unit 14. The model generation unit 13 includes the real machine model generation unit 131 and the imaging model generation unit 132. The real machine model generation unit 131 generates a model of the real machine 3, using the first command information S4. The imaging model generation unit 132 generates a model of the imaging means 4, using the second command information S5. The model information S6, which is a combination of the model of the real machine 3 and the model of the imaging means 4, is, for example, a three-dimensional model virtually projected so that the real machine 3 can be seen from a predetermined direction. The predetermined direction is the same as the direction in which the imaging means 4 captures the real machine 3. That is, the model generation unit 13 outputs the model information S6 that is the combination of the model of the real machine 3 and the model of the imaging means 4.

The video model generation unit 14 receives the movable range S3 from the limitation unit 11, and the model information S6 from the model generation unit 13. On the basis of these pieces of information, the video model generation unit 14 generates a movable information video S7 which is a video of the movable range S3, and provides the movable information video S7 for the video display unit 15. The movable information video S7 is a video of the movable range S3 corresponding to the real machine 3.

The video display unit 15 receives the movable information video S7 from the video model generation unit 14, and a real machine video S8 from the imaging means 4. The video display unit 15 generates a video S9 on the basis of the movable information video S7 and the real machine video S8, and presents the video S9 to the operator. The video display unit 15 displays the real machine video S8 and the movable information video S7. The real machine video S8 is a captured video of the real machine 3. The video display unit 15 adjusts the position of the movable information video S7 so that the position of the three-dimensional model in the movable information video S7 coincides with the position of the real machine in the real machine video S8. As a result, the movable information video S7 is superimposed at an accurate position on the real machine video S8. The position of the movable information video S7 may be adjusted by an image process using image feature points or markers of the movable information video S7 and the real machine video S8. Alternatively, the position adjustment may be performed by correcting initial positions of the movable information video S7 and the real machine video S8. A method for adjusting the position of the movable information video S7 is not limited thereto. In addition, the video display unit 15 does not need to display the real machine video S8 and the movable information video S7 in a superimposed manner, and may display the individual videos on different screens, for example. However, the following description will be given assuming that videos are displayed in a superimposed manner.

The real machine 3 receives the first command information S4 from the control unit 12, a reaction force S11 from a target 5, and a reaction force S12 from a non-target 6. The real machine 3 generates an action force S10 on the basis of the first command information S4, and applies the action force S10 to the target 5. The target 5 is an object to be moved with the action force S10 exerted thereon by the real machine 3. The reaction force S11 from the target 5 is generated when the real machine 3 moves the target 5. The reaction force S12 from the non-target 6 is generated when the real machine 3 moves the target 5 into contact with the non-target 6.

The imaging means 4 receives the second command information S5 from the control unit 12. The imaging means 4 captures the real machine 3 on the basis of the second command information S5 to thereby generate the real machine video S8, and provides the real machine video S8 for the video display unit 15.

The target 5 receives the action force S10 from the real machine 3. The target 5 applies the reaction force S11 to the real machine 3 on the basis of the action force S10.

When the target 5 comes into contact with the non-target 6, the non-target 6 applies the reaction force S12 to the real machine 3. Although not illustrated, the reaction force S12 also includes a force from the non-target 6 via the target 5. Unlike the target 5, the non-target 6 is an object to which the real machine 3 does not intentionally apply the action force S10.

In FIG. 1, if the imaging means 4 is always fixed at the same position and is always in a capturing ON state, the real machine video S8 can be obtained even if the second command information S5 is not input to the imaging means 4. In that case, the second command information S5 does not need to be input to the imaging means 4, and is input only to the imaging model generation unit 132. The same applies to the following embodiments.

Figure 2:
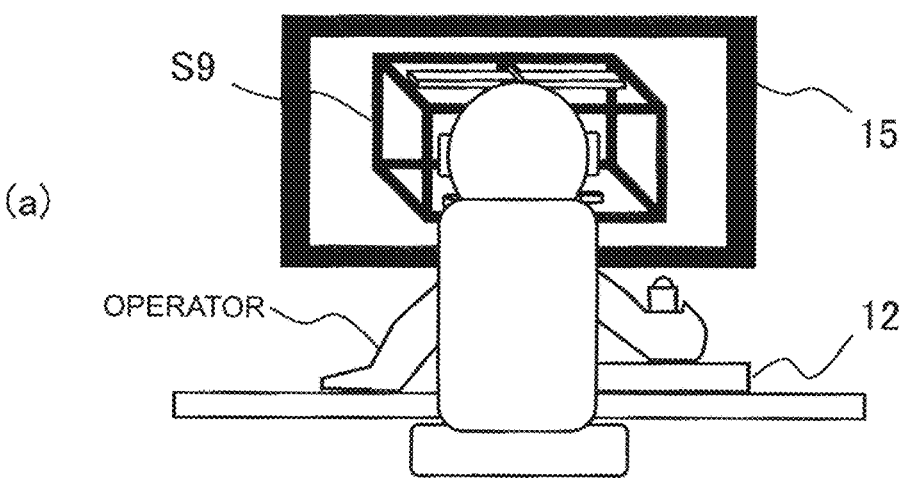
FIG. 2 is a set of schematic views illustrating an example of a configuration including a control unit in the first embodiment.
Figure 2:
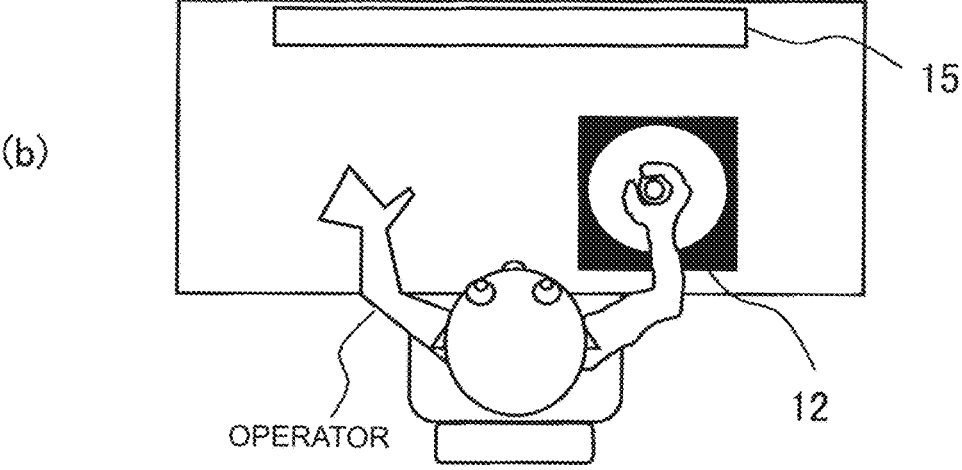

FIGS. 2(*a*) and 2(*b*) are schematic views illustrating an example of a configuration including the control unit 12 in the first embodiment. FIG. 2(*a*) is a view of the operator as viewed from the back, and FIG. 2(*b*) is a view of the operator as viewed from the top.

As illustrated in FIG. 2, watching the video S9 on the video display unit 15, the operator remotely controls the real machine 3, using the control unit 12. Since the control unit 12, the video display unit 15, and the video S9 illustrated in FIG. 2 are the same as the control unit 12, the video display unit 15, and the video S9 illustrated in FIG. 1, the descriptions thereof will be omitted.

Figure 3:
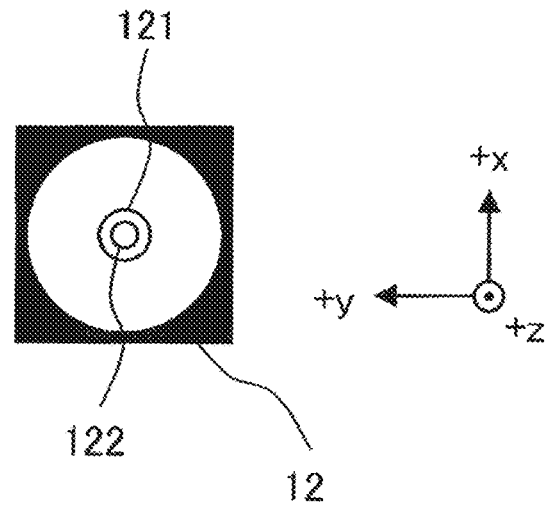
FIG. 3 is a schematic view illustrating an example of the control unit in the first embodiment.

FIG. 3 is a schematic view illustrating an example of the control unit 12 in the first embodiment. As illustrated in FIG. 3, the control unit 12 includes the control stick 121 and the button 122.

The control stick 121 is a controller operable in the x-axis direction, the y-axis direction, and an xy plane. The control stick 121 is used to remotely control the real machine 3. That is, the real machine 3 moves corresponding to an operating direction of the control stick 121. For example, when the operator operates the control stick 121 in the +x direction, the real machine 3 moves in the +x direction.

The button 122 is a button for moving the real machine 3 in the z-axis direction. For example, when the operator continues pressing the button 122, the real machine 3 moves in the +z direction, and when the button 122 is released, the real machine 3 moves in the −z direction, during which when the button 122 is pressed, the real machine 3 stops the movement.

The control unit 12 is not limited to one including the control stick 121 and the button 122 as illustrated in FIG. 3. For example, the operator may operate the real machine 3 with an operator's gesture. Alternatively, wearing an auxiliary device (not illustrated) simulating the real machine 3, the operator may operate the real machine 3 with that auxiliary device. The gesture is, for example, an action of waving a hand toward a camera (not illustrated) disposed near the operator. The real machine 3 moves corresponding to the gesture or the operating direction of the auxiliary device. For example, when the operator gesticulates or operates the auxiliary device in the +x direction, the real machine moves in the +x direction.

Figure 4:
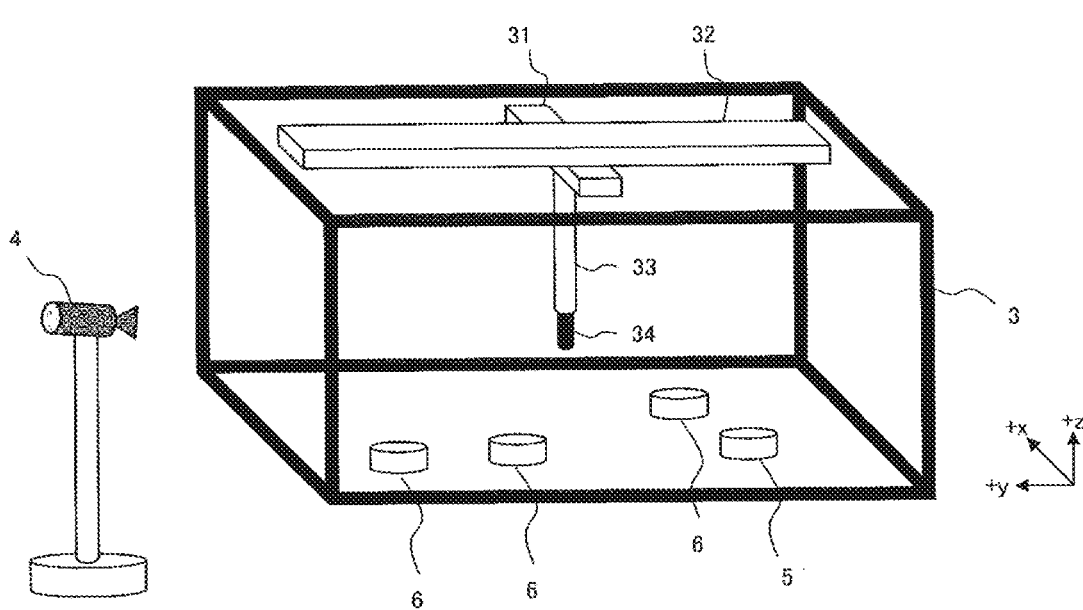
FIG. 4 is a schematic view illustrating an example of a configuration including a real machine in the first embodiment.

FIG. 4 is a schematic view illustrating an example of a configuration including the real machine 3 in the first embodiment. Since the imaging means 4, the target 5, and the non-target 6 illustrated in FIG. 4 are the same as the imaging means 4, the target 5, and the non-target 6 illustrated in FIG. 1, the descriptions thereof will be omitted.

As illustrated in FIG. 4, the real machine 3 includes the x-axis translation mechanism 31, the y-axis translation mechanism 32, the z-axis translation mechanism 33, and a real machine end 34.

The x-axis translation mechanism 31 moves the real machine end 34 in the x-axis direction. That is, when the operator operates the control stick 121 of the control unit 12 in the x-axis direction, the x-axis translation mechanism 31 moves the real machine end 34 in the x-axis direction.

The y-axis translation mechanism 32 moves the real machine end 34 in the y-axis direction. That is, when the operator operates the control stick 121 of the control unit 12 in the y-axis direction, the y-axis translation mechanism 32 moves the real machine end 34 in the y-axis direction.

The z-axis translation mechanism 33 moves the real machine end 34 in the z-axis direction. That is, when the operator presses the button 122 of the control unit 12, the z-axis translation mechanism 33 moves the real machine end 34 in the z-axis direction.

The real machine end 34 moves on the basis of the control information S2 from the operator.

In FIG. 4, the imaging means 4 is disposed in such a position that the real machine 3 is within the field of view. The imaging means 4 captures the real machine 3 to thereby generate the real machine video S8. The video display unit 15 displays the real machine video S8, as in a conventional remote control device. The video display unit 15 in the first embodiment displays the video S9 having the real machine video S8 and the movable information video S7 superimposed on each other. The movable information video S7 is a video of the movable range S3 of the real machine 3. A method for setting the movable range S3 by the limitation unit 11 will be hereinafter described.

The limitation unit 11 sets the movable range S3 of the real machine 3 in any one of five modes (hereinafter referred to as a "first mode", a "second mode", a "third mode", a "fourth mode", and a "fifth mode"). The first mode is a mode of setting the movable range S3 by a means for forcibly limiting operation of the control unit 12. The second mode is a mode of setting the movable range S3 by pressing a button corresponding to a direction in which movement is possible. The third mode is a mode of setting the movable range S3 by a movable pattern prepared in advance. The fourth mode is a mode of setting the movable range S3 by a straight line or a curve interconnecting a plurality of constraint points. The fifth mode is a mode of setting the movable range S3 by a light source model generation unit 133 that generates a model of a light source that emits light.

Figure 5:
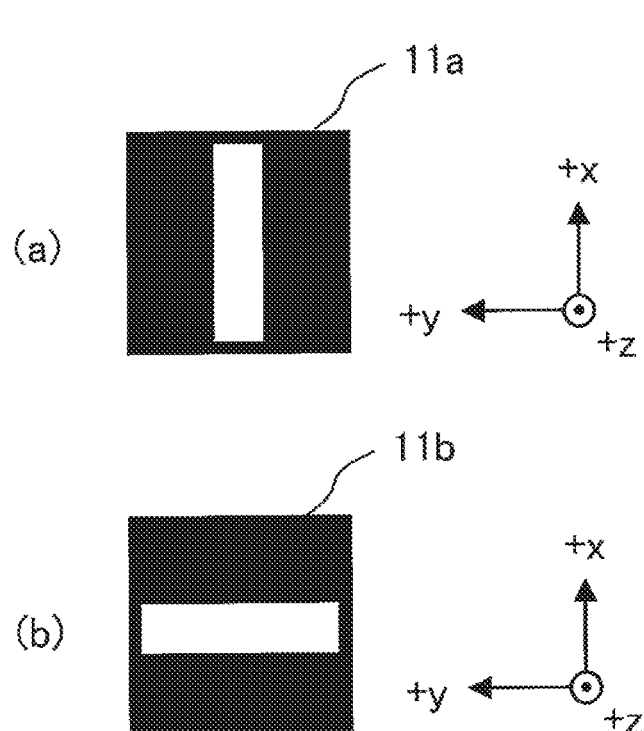
FIG. 5 is a set of schematic views each illustrating an example of a limitation unit in the case of setting a movable range in a first mode in the first embodiment.

First, the first mode will be described in detail. In the first mode, the control unit 12 includes a means for forcibly limiting the operator's control. The limitation unit 11 sets the movable range S3 with this means. The forcibly limiting means is a means for physically limiting a range in which the control unit 12 is operable. Examples thereof include an x-axis translation plate 11*a* and a y-axis translation plate 11*b*, as will be described later. FIGS. 5(*a*) and 5(*b*) are schematic views each illustrating an example of the limitation unit 11 in the case of setting the movable range S3 in the first mode in the first embodiment. FIG. 5(*a*) is a schematic view in a case where the limitation unit 11 is the x-axis translation plate 11*a*. FIG. 5(*b*) is a schematic view in a case where the limitation unit 11 is the y-axis translation plate 11*b*.

The x-axis translation plate 11*a* illustrated in FIG. 5(*a*) is attached to the control unit 12. As a result, the operation of the control stick 121 can be restricted to that in the x-axis direction. Similarly, the y-axis translation plate 11*b* illustrated in FIG. 5(*b*) is attached to the control unit 12. As a result, the operation of the control stick 121 can be restricted to that in the y-axis direction.

Figure 6:
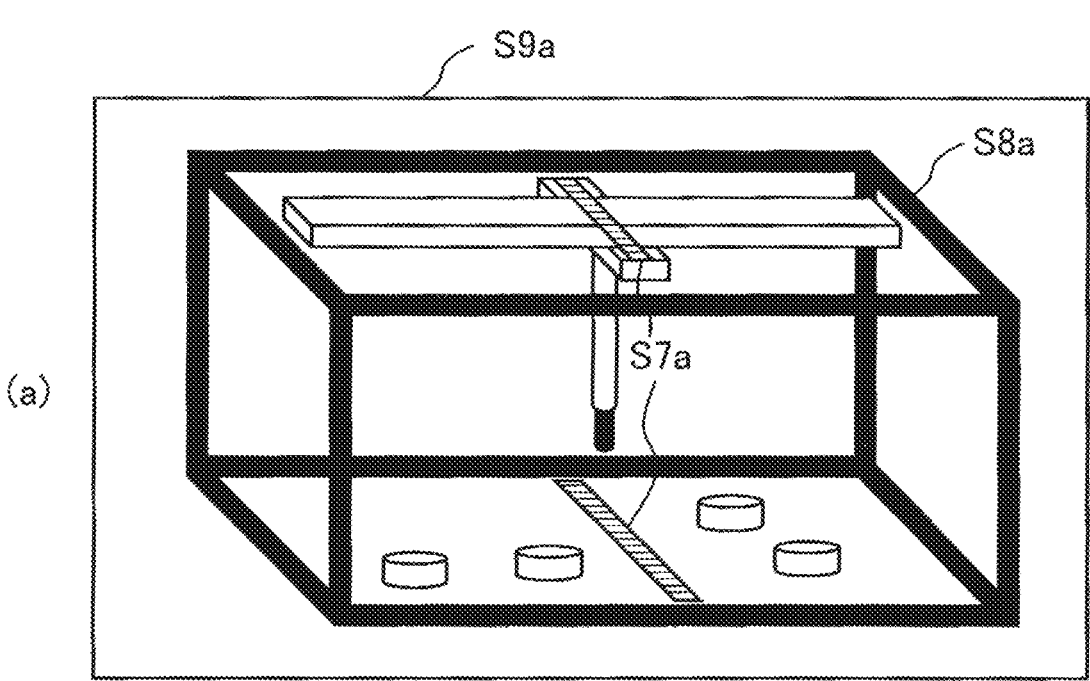
FIG. 6 is a set of schematic views each illustrating an example of a video on a video display unit in a case where the movable range is set in the first mode in the first embodiment.
Figure 6:
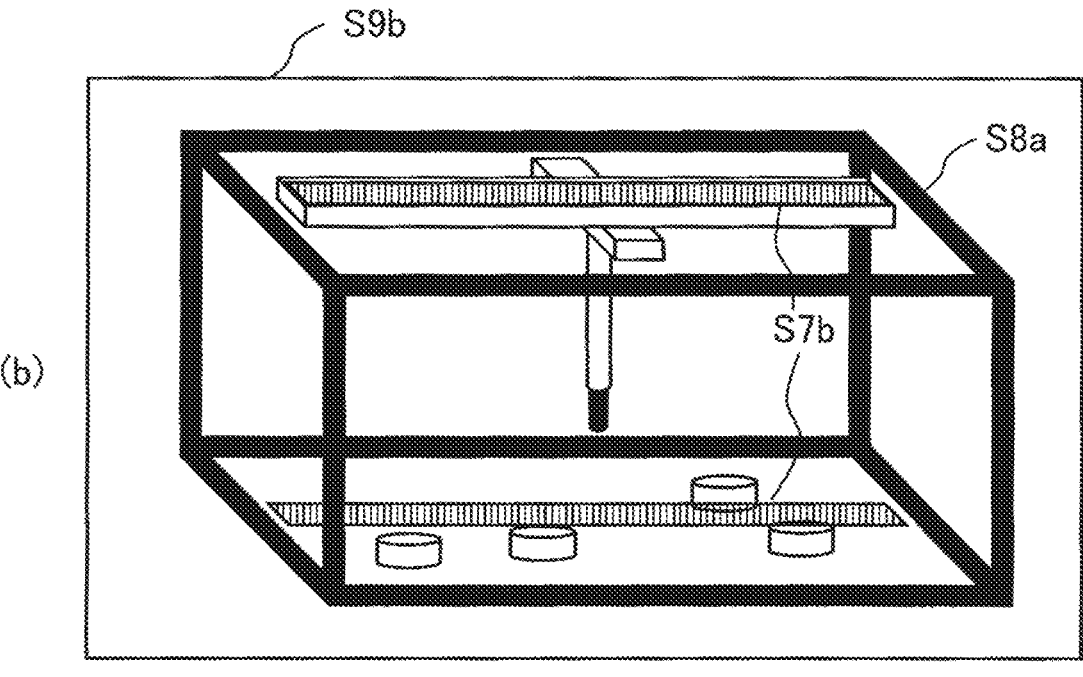

FIGS. 6(*a*) and 6(*b*) are schematic views each illustrating an example of the video S9 on the video display unit 15 in a case where the movable range S3 is set in the first mode in the first embodiment. FIG. 6(*a*) is a schematic view of a video S9*a* in a case where the x-axis translation plate 11*a* is attached to the control unit 12. FIG. 6(*b*) is a schematic view of a video S9*b* in a case where the y-axis translation plate 11*b* is attached to the control unit 12.

As illustrated in FIG. 6(*a*), the video S9*a* is a video having a real machine video S8*a* and a movable information video S7*a* superimposed on each other. The real machine video S8*a* is a video of the real machine 3 captured by the imaging means 4. The movable information video S7*a*, which is generated by the video model generation unit 14, is a video of the movable range S3. In a case of FIG. 6(*a*), the movable information video S7*a*, which is a video of the movable range S3 in the same direction as the x-axis direction, is displayed on upper and lower sides of the real machine video S8*a*.

As illustrated in FIG. 6(*b*), the video S9*b* is a video having the real machine video S8*a* and a movable information video S7*b* superimposed on each other. The movable information video S7*b*, which is generated by the video model generation unit 14, is a video of the movable range S3. In a case of FIG. 6(*b*), the movable information video S7*b*, which is a video of the movable range S3 in the same direction as the y-axis direction, is displayed on the upper and lower sides of the real machine video S8*a*.

When the x-axis translation plate 11*a* is attached to the control unit 12, the video model generation unit 14 identifies the movable range S3 as being in the x-axis direction. Similarly, when the y-axis translation plate 11*b* is attached to the control unit 12, the video model generation unit 14 identifies the movable range S3 as being in the y-axis direction. In addition, the video model generation unit 14 generates the movable information video S7*a* by matching the identified information and the model information S6 from the model generation unit 13. The video model generation unit 14 may use space information, that is, vector information instead of the model information S6. The space information is obtained by performing an image process on the real machine video S8*a*. The vector information corresponds to the x-axis direction in the real machine video S8a. In that case, the video model generation unit 14 matches the identified information and the space information to thereby generate the movable information video S7a. The same applies where the y-axis translation plate 11b is attached to the control unit 12.

The movable information videos S7a and S7b are displayed in FIGS. 6(a) and 6(b) on the upper side and the lower side in the real machine video S8a, respectively. However, the displayed movable information videos S7a and S7b may be displayed at other locations provided that it can be seen that the movable information videos S7a and S7b and the movable range S3 are in the same direction. For example, the displayed movable information videos S7a and S7b are displayed at the center in the real machine video S8a. The same applies to the following embodiments.

In addition, the video display unit 15 may superimpose a video of the real machine end 34 at a position on the xy plane on the videos S9a and S9b. For example, a projection point (not illustrated) of the real machine end 34 on the xy plane is superimposed on the movable information videos S7a and S7b. The x coordinate and the y coordinate of the projection point, which are the x coordinate and the y coordinate of the real machine end 34, correspond to the amount of operation of the control stick 121 in the x-axis direction and the amount of operation thereof in the y-axis direction, respectively. Information regarding the amounts of operation is included in the model information S6. The video model generation unit 14 generates a video of the projection point on the basis of the model information S6, and the video display unit 15 superimposes the video of the projection point on the video S9a and the video S9b. The same applies to the following embodiments. Superimposing the projection point on the videos S9a and S9b improves the operability of the real machine 3.

The limitation unit 11 in the first mode is not limited to the x-axis translation plate 11a and the y-axis translation plate lib, but may be, for example, a translation plate in an oblique direction (not illustrated) or a translation plate capable of moving in both the x-axis direction and the y-axis direction (not illustrated). Alternatively, the limitation unit 11 may be an operator's gesture of waving the hand, or may be provided by the operator-wearing auxiliary device (not illustrated) simulating the real machine. In the case of the gesture, the movable range S3 of the real machine 3 is set by the gesture, after which the real machine 3 is remotely controlled by the gesture, as well. In a case where the operator wears the auxiliary device, the auxiliary device itself has a structure that provides the limited movable range S3. That is, when the operator wears the auxiliary device, the operator remotely controls the real machine 3 with the movable range S3 being limited. An example thereof is a mobile suit.

In a case where the movable range S3 is set in the first mode, the operator operates the control unit 12, checking the movable information video S7a or S7b with the movable range S3 limited. This improves work efficiency in performing the remote operation of the real machine 3.

Figure 7:
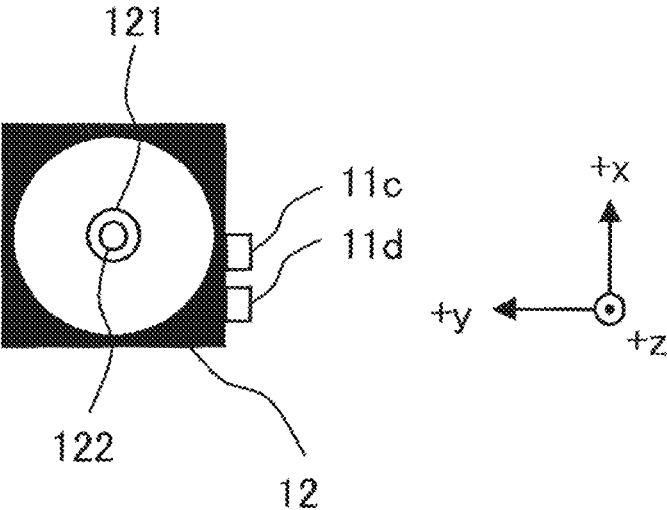
FIG. 7 is a schematic view illustrating an example of the limitation unit in the case of setting the movable range in a second mode in the first embodiment.

Next, the second mode will be described in detail. In the second mode, the control unit 12 includes a button corresponding to a direction in which movement is possible. The button is pushed to allow the limitation unit 11 to set the movable range S3. FIG. 7 is a schematic view illustrating an example of the limitation unit 11 in the case of setting the movable range S3 in the second mode in the first embodiment. FIG. 7 is a schematic view in a case where the limitation unit 11 is an x-axis restriction button 11c and a y-axis restriction button 11d.

The x-axis restriction button 11c and the y-axis restriction button 11d illustrated in FIG. 7 are provided on the control unit 12. When the operator presses the x-axis restriction button 11c, the operation of the control stick 121 can be restricted to that in the x-axis direction. Similarly, when the operator presses the y-axis restriction button 11d, the operation of the control stick 121 can be restricted to that in the y-axis direction. The x-axis restriction button 11c and the y-axis restriction button 11d are not necessarily required to be provided on the control unit 12, but may be provided at any location as long as these buttons are near the operator.

Figure 8:
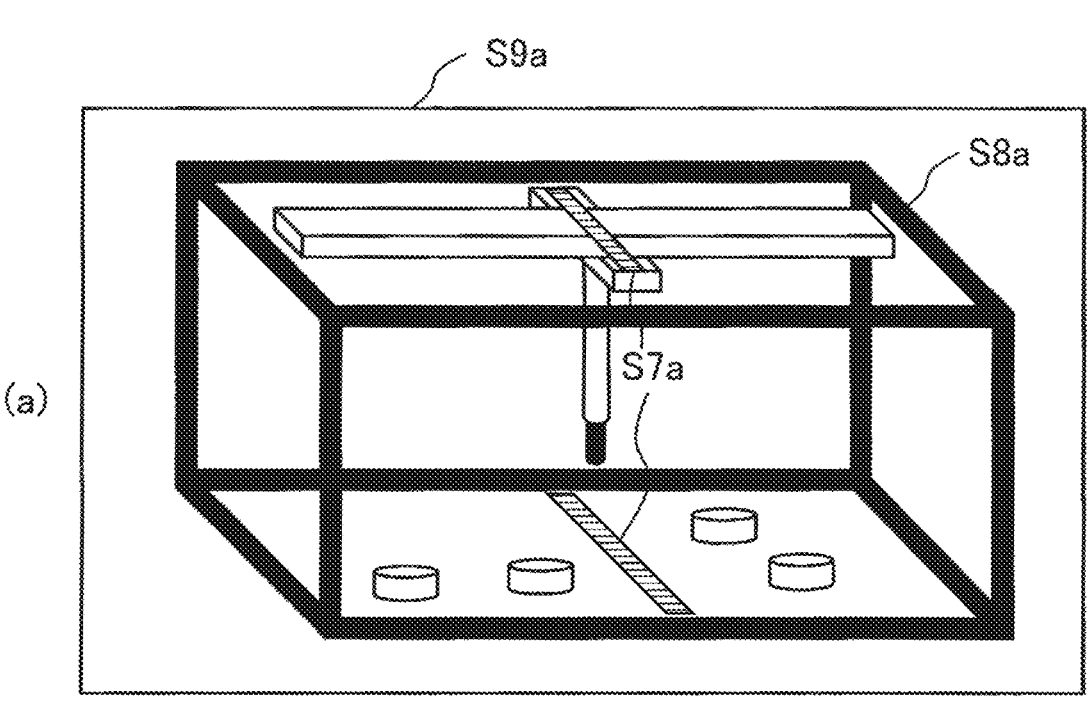
FIG. 8 is a set of schematic views each illustrating an example of the video on the video display unit in a case where the movable range is set in the second mode in the first embodiment.
Figure 8:
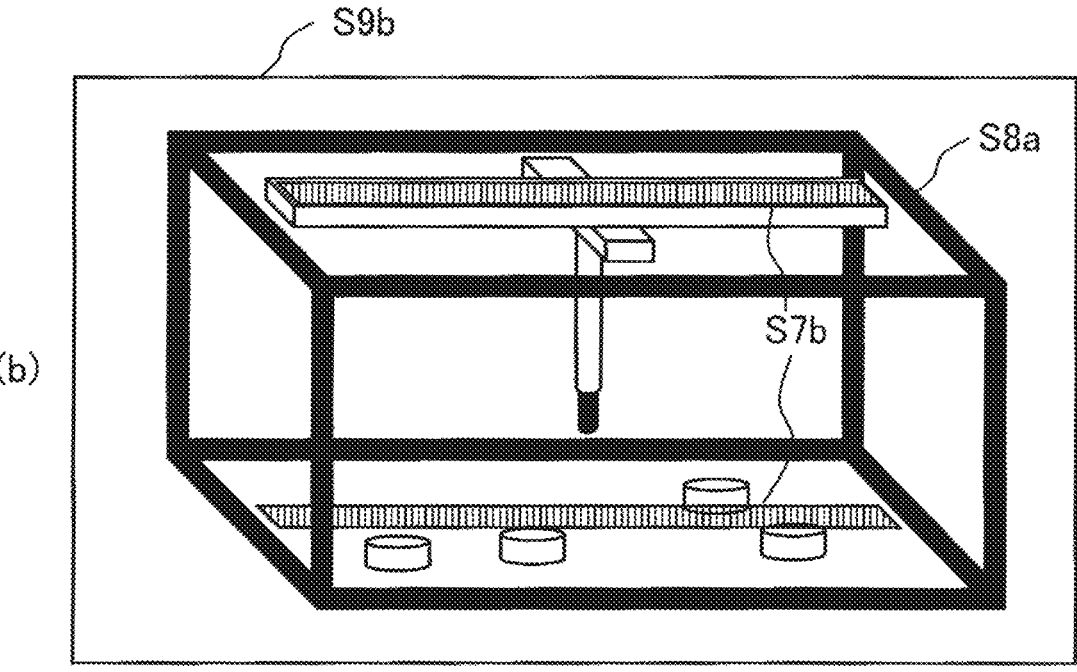

FIGS. 8(a) and 8(b) are schematic views each illustrating an example of the video S9 on the video display unit 15 in a case where the movable range S3 is set in the second mode in the first embodiment. FIG. 8(a) is a schematic view of the video S9a when the x-axis restriction button 11c is pressed. FIG. 8(b) is a schematic view of the video S9b when the y-axis restriction button 11d is pressed. Since the video S9a in FIG. 8(a) is the same as the video S9a in FIG. 6(a), and the video S9b in FIG. 8(b) is the same as the video S9b in FIG. 6(b), the descriptions thereof will be omitted.

When the x-axis restriction button 11c is pressed, the video model generation unit 14 identifies the movable range S3 as being in the x-axis direction. As a result, the movable information video S7a is generated. Similarly, when the y-axis restriction button 11d is pressed, the video model generation unit 14 identifies the movable range S3 as being in the y-axis direction. As a result, the movable information video S7b is generated.

When both the x-axis restriction button 11c and the y-axis restriction button 11d are pressed, the movable range S3 is in both the x-axis direction and the y-axis direction.

As discussed above, when the x-axis restriction button 11c is pressed, the movable range S3 is in the x-axis direction, and when the y-axis restriction button 11d is pressed, the movable range S3 is in the y-axis direction. Instead thereof, the structure of the x-axis restriction button 11c may be designed such that when pressed, the x-axis restriction button 11c inhibits the movable range in the x-axis direction while the structure of the y-axis restriction button 11d is designed such that when pressed, the y-axis restriction button 11d inhibits the movable range in the y-axis direction. In this case, when the x-axis restriction button 11c is pressed, the movable range S3 is in the y-axis direction, and when the y-axis restriction button 11d is pressed, the movable range S3 is in the x-axis direction.

In a case where the movable range S3 is set in the second mode, it becomes not only possible to achieve the effect in the first mode, but also eliminates the need for the x-axis and y-axis translation plates 11a and 11b necessary in the first mode, such that the operator can save time and effort in attachment of these plates to the control unit 12.

Figure 9:
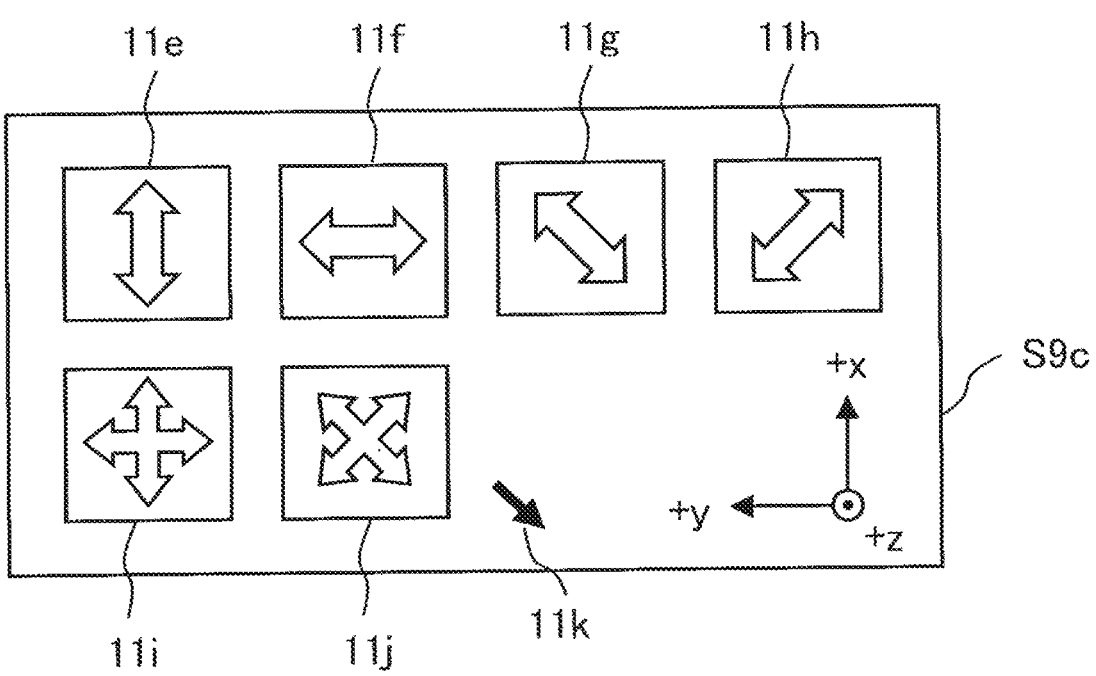
FIG. 9 is a schematic view illustrating an example of the limitation unit in the case of setting the movable range in a third mode in the first embodiment.

Next, the third mode will be described in detail. In the third mode, the limitation unit 11 sets the movable range S3 in a movable pattern prepared in advance. FIG. 9 is a schematic view illustrating an example of the limitation unit 11 in the case of setting the movable range S3 in the third mode in the first embodiment.

As illustrated in FIG. 9, a video S9c from the video display unit 15 displays limitation patterns 11e to 11j. The limitation patterns 11e to 11j are movable patterns prepared in advance. Before remotely operating the real machine 3, the operator selects any one of the restriction patterns 11e to 11j, using the control unit 12. For example, in a case where the operator selects the restriction pattern 11e, the operator presses the button 122, hovering a cursor 11k over the restriction pattern 11e, using the control stick 121. As a result, the limitation unit 11 sets the movable range S3 in the x-axis direction. The movable pattern is not limited to the limitation patterns 11e to 11j. In addition, the video display unit 15 may have a touch display function, and the operator may manually operate a screen for selection from the limitation patterns 11e to 11j. This eliminates the necessity of the cursor 11k, which enables simple operation.

Figures 10, 11:
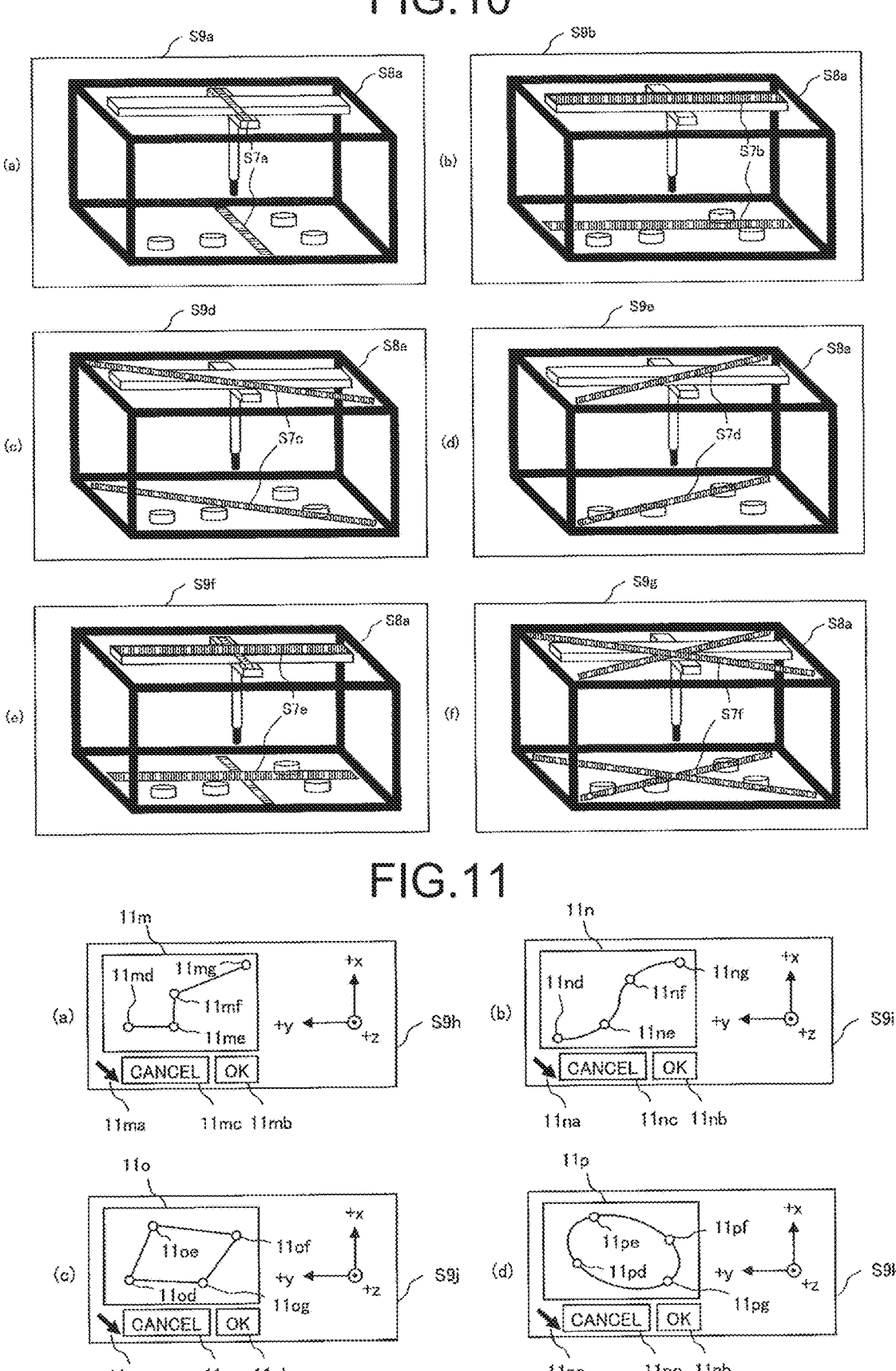
FIG. 10 is a set of schematic views each illustrating an example of the video on the video display unit in a case where the movable range is set in the third mode in the first embodiment.
FIG. 11 is a set of schematic views each illustrating an example of the limitation unit in the case of setting the movable range in a fourth mode in the first embodiment.
Figure 12:
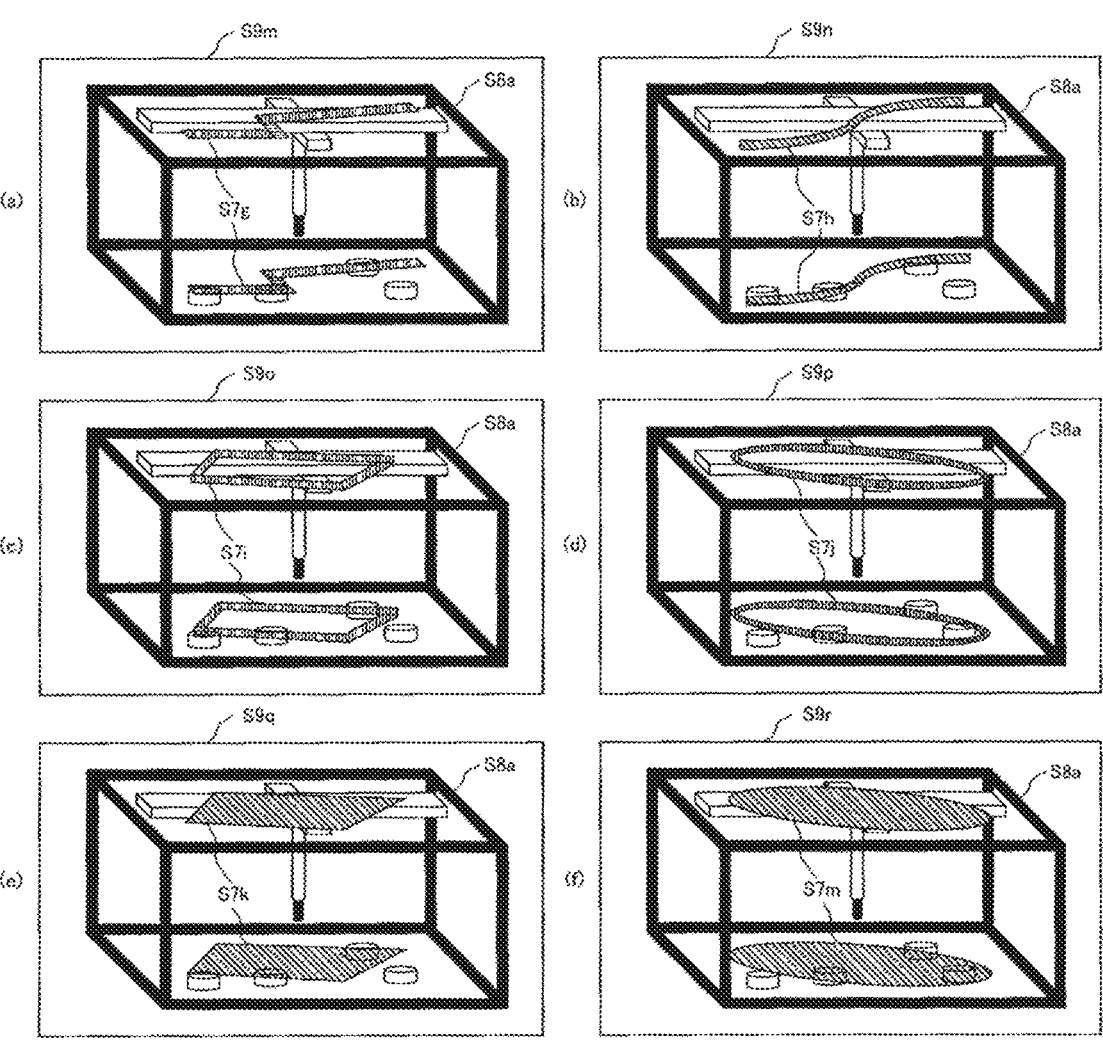
FIG. 12 is a set of schematic views each illustrating an example of the video on the video display unit in a case where the movable range is set in the fourth mode in the first embodiment.

FIGS. 10(a) to 10(f) are schematic views each illustrating an example of the video S9 on the video display unit 15 in a case where the movable range S3 is set in the third mode in the first embodiment. FIG. 10(a) is a schematic view of the video S9a in a case where the limitation pattern 11e is selected. FIG. 10(b) is a schematic view of the video S9b in a case where the limitation pattern 11f is selected. FIG. 10(c) is a schematic view of a video S9d in a case where the limitation pattern 11g is selected. FIG. 10(d) is a schematic view of a video S9e in a case where the limitation pattern 11h is selected. FIG. 10(e) is a schematic view of a video S9f in a case where the limitation pattern 11i is selected. FIG. 10(f) is a schematic view of a video S9g in a case where the limitation pattern 11j is selected. Since the video S9a in FIG. 10(a) is the same as the video S9a in FIG. 6(a), and the video S9b in FIG. 10(b) is the same as the video S9b in FIG. 6(b), the descriptions thereof will be omitted.

As illustrated in FIG. 10(c), the video S9d is a video having the real machine video S8a and a movable information video S7c superimposed on each other. The real machine video S8a is a video of the real machine 3 captured by the imaging means 4. The movable information video S7c, which is generated by the video model generation unit 14, is a video of the movable range S3. In a case of FIG. 10(c), the movable information video S7c is a video of the movable range S3 in an oblique direction.

As illustrated in FIG. 10(d), the video S9e is a video having the real machine video S8a and a movable information video S7d superimposed on each other. The real machine video S8a is a video of the real machine 3 captured by the imaging means 4. The movable information video S7d, which is generated by the video model generation unit 14, is a video of the movable range S3. In a case of FIG. 10(d), the movable information video S7d is a video of the movable range S3 in an oblique direction.

As illustrated in FIG. 10(e), the video S9f is a video having the real machine video S8a and a movable information video S7e superimposed on each other. The real machine video S8a is a video of the real machine 3 captured by the imaging means 4. The movable information video S7e, which is generated by the video model generation unit 14, is a video of the movable range S3. In a case of FIG. 10(e), the movable information video S7e is a video of the movable range S3 in the same direction as the x-axis direction and the same direction as the y-axis direction.

As illustrated in FIG. 10(f), the video S9g is a video having the real machine video S8a and a movable information video S7f superimposed on each other. The real machine video S8a is a video of the real machine 3 captured by the imaging means 4. The movable information video S7f, which is generated by the video model generation unit 14, is a video of the movable range S3. In a case of FIG. 10(f), the movable information video S7f is a video of the movable range S3 in two oblique directions.

When the limitation unit 11e is selected, the video model generation unit 14 identifies the movable range S3 as being in the x-axis direction. As a result, the movable information video S7a is generated. The same applies where the limitation units 11f to 11j are selected.

In a case where the movable range S3 is set in the third mode, the effect in the second mode is achieved, and the number of options of the movable range S3 increases as well.

Next, the fourth mode will be described in detail. In the fourth mode, the limitation unit 11 sets the movable range S3 with a straight line or a curve interconnecting a plurality of constraint points. FIGS. 11(a) to 11(d) are schematic views each illustrating an example of the limitation unit 11 in the case of setting the movable range S3 in the fourth mode in the first embodiment.

As illustrated in FIG. 11(a), watching a video S9h, the operator sets the movable range S3, using the control unit 12. Specifically, hovering a cursor 11ma over any locations in a limitation unit 11m, using the control stick 121, the operator presses the button 122 to thereby set a plurality of constraint points. In FIG. 11(a), four constraint points 11md, 11me, 11mf, and 11mg are set in order. When an OK button 11mb is pressed after the setting of the constraint points, the setting of the movable range S3 ends. When a CANCEL button 11mc is pressed during the setting, the process returns to the previous constraint point setting. For example, when the CANCEL button 11mc is pressed after the constraint point 11mf is set, the process returns to a state in which the constraint point 11me is set. As a result, the constraint point can be reset. In a case of FIG. 11(a), a set of straight lines interconnecting the four constraint points 11md, 11me, 11mf, and 11mg is the movable range S3.

As illustrated in FIG. 11(b), watching a video S9i, the operator sets the movable range S3, using the control unit 12. Specifically, hovering a cursor 11na over any locations in a limitation unit 11n, using the control stick 121, the operator presses the button 122 to thereby set a plurality of constraint points. In FIG. 11(b), four constraint points 11nd, 11ne, 11nf, and 11ng are set in order. When an OK button 11nb is pressed after the setting of the constraint points, the setting of the movable range S3 ends. After each constraint point is set, the cursor 11na is moved to the next constraint point with the button 122 pressed. As a result, the movable range S3 in accordance with a movement path is set in the form of a straight line or any curve. When the cursor 11na is moved with the button 122 pressed, however, the straight line or the curve could be distorted. To address this, the control unit 12, which has a function of automatically correcting such a distortion, corrects and thus eliminates the distortion. When a CANCEL button 11nc is pressed during the setting, the process returns to the previous constraint point setting. For example, when the CANCEL button 11nc is pressed after the constraint point 11nf is set, the process returns to a state in which the constraint point 11ne is set. As a result, the constraint point can be reset. In a case of FIG. 11(b), a curve interconnecting the four constraint points 11nd, 11ne, 11nf, and 11ng is the movable range S3.

As illustrated in FIG. 11(c), watching a video S9j, the operator sets the movable range S3, using the control unit 12. Specifically, hovering a cursor 11oa over any locations in a limitation unit 11o, using the control stick 121, the operator presses the button 122 to thereby set a plurality of constraint points. In FIG. 11(c), four constraint points 11od, 11oe, 11of, and 11og are set in order, and the constraint point 11od is set again. When an OK button 11ob is pressed after the setting of the constraint points, the setting of the movable range S3 ends. When a CANCEL button 11oc is pressed during the setting, the process returns to the previous constraint point setting. For example, when the CANCEL button $11oc$ is pressed after the constraint point $11of$ is set, the process returns to a state in which the constraint point $11oe$ is set. As a result, the constraint point can be reset. In the case of FIG. $11(c)$, a set of straight lines interconnecting the four constraint points $11od$, $11oe$, $11of$, and $11og$ or a region surrounded by the straight lines is the movable range S3. The movable range S3 in the form of the straight lines or the region is selective in advance.

As illustrated in FIG. $11(d)$, watching a video $S9k$, the operator sets the movable range S3, using the control unit 12. Specifically, hovering a cursor $11pa$ over any locations in a limitation unit $11p$, using the control stick 121, the operator presses the button. 122 to thereby set a plurality of constraint points. In FIG. $11(d)$, four constraint points $11pd$, $11pe$, $11pf$, and $11pg$ are set in order, and the constraint point $11pd$ is set again. When an OK button $11pb$ is pressed after the setting of the constraint points, the setting of the movable range S3 ends. After each constraint point is set, the cursor $11pa$ is moved to the next constraint point with the button 122 pressed. As a result, the movable range S3 in accordance with a movement path is set in the form of a straight line or any curve. When the cursor $11pa$ is moved with the button 122 pressed, however, the straight line or the curve could be distorted. To address this, the control unit 12, which has a function of automatically correcting such a distortion, corrects and thus eliminates the distortion. When a CANCEL button $11pc$ is pressed during the setting, the process returns to the previous constraint point setting. For example, when the CANCEL button $11pc$ is pressed after the constraint point $11pf$ is set, the process returns to a state in which the constraint point $11pe$ is set. As a result, the constraint point can be reset. In a case of FIG. $11(d)$, a curve interconnecting the four constraint points $11pd$, $11pe$, $11pf$, and $11pg$ or a region surrounded by the curve is the movable range S3. The movable range S3 in the form of the straight lines or the region is selective in advance.

In FIGS. $11(a)$ to $11(d)$, the video display unit 15 may have a touch display function, and the operator may manually operate a screen to set the movable range S3. As a result, the necessity of the cursors $11ma$, $11na$, $11oa$, and $11pa$ is eliminated, which enables simple operation.

FIGS. $12(a)$ to $12(f)$ are schematic views each illustrating an example of the video S9 on the video display unit 15 in a case where the movable range S3 is set in the fourth mode in the first embodiment. FIG. $12(a)$ is a schematic view of a video $S9m$ having a movable information video $S7g$ superimposed on the real machine video $S8a$, the movable information video $S7g$ being generated by the video model generation unit 14 with the movable range S3 set by the limitation unit $11m$. FIG. $12(b)$ is a schematic view of a video $S9n$ having a movable information video $S7h$ superimposed on the real machine video $S8a$, the movable information video $S7h$ being generated by the video model generation unit 14 with the movable range S3 set by the limitation unit $11n$. FIG. $12(c)$ is a schematic view of a video S90 having a movable information video $S7i$ superimposed on the real machine video $S8a$, the movable information video $S7i$ being generated by the video model generation unit 14 with the movable range S3 set by the limitation unit $11o$. FIG. $12(d)$ is a schematic view of a video $S9p$ having a movable information video $S7j$ superimposed on the real machine video $S8a$, the movable information video $S7j$ being generated by the video model generation unit 14 with the movable range S3 set by the limitation unit $11p$. FIG. $12(e)$ is a schematic view of another video $S9q$ having a movable information video $S7k$ superimposed on the real machine video $S8a$, the movable information video $S7k$ being generated by the video model generation unit 14 with the movable range S3 set by the limitation unit $11o$. FIG. $12(f)$ is a schematic view of another video $S9r$ having a movable information video $S7m$ superimposed on the real machine video $S8a$, the movable information video $S7m$ being generated by the video model generation unit 14 with the movable range S3 set by the limitation unit $11p$.

As illustrated in FIG. $12(a)$, the video $S9m$ is a video having the real machine video $S8a$ and the movable information video $S7g$ superimposed on each other. The real machine video $S8a$ is a video of the real machine 3 captured by the imaging means 4. The movable information video $S7g$, which is generated by the video model generation unit 14, is a video of the movable range S3. In the case of FIG. $12(a)$, the movable information video $S7g$ is a video of the movable range S3 which is a set of straight lines interconnecting four constraint points.

As illustrated in FIG. $12(b)$, the video $S9n$ is a video having the real machine video $S8a$ and the movable information video $S7h$ superimposed on each other. The real machine video $S8a$ is a video of the real machine 3 captured by the imaging means 4. The movable information video $S7h$, which is generated by the video model generation unit 14, is a video of the movable range S3. In the case of FIG. $12(b)$, the movable information video $S7h$ is a video of the movable range S3 which is a curve interconnecting four constraint points.

As illustrated in FIG. $12(c)$, the video S90 is a video having the real machine video $S8a$ and the movable information video $S7i$ superimposed on each other. The real machine video $S8a$ is a video of the real machine 3 captured by the imaging means 4. The movable information video $S7i$, which is generated by the video model generation unit 14, is a video of the movable range S3. In a case of FIG. $12(c)$, the movable information video $S7i$ is a video of the movable range S3 which is a set of straight lines interconnecting four constraint points.

As illustrated in FIG. $12(d)$, the video $S9p$ is a video having the real machine video $S8a$ and the movable information video $S7j$ superimposed on each other. The real machine video $S8a$ is a video of the real machine 3 captured by the imaging means 4. The movable information video $S7j$, which is generated by the video model generation unit 14, is a video of the movable range S3. In a case of FIG. $12(d)$, the movable information video $S7j$ is a video of the movable range S3 which is a curve interconnecting four constraint points.

As illustrated in FIG. $12(e)$, the video $S9q$ is a video having the real machine video $S8a$ and the movable information video $S7k$ superimposed on each other. The real machine video $S8a$ is a video of the real machine 3 captured by the imaging means 4. The movable information video $S7k$, which is generated by the video model generation unit 14, is a video of the movable range S3. In the case of FIG. $12(e)$, the movable information video $S7k$ is a video of the movable range S3 which is a region surrounded by a set of straight lines interconnecting four constraint points.

As illustrated in FIG. $12(f)$, the video $S9r$ is a video having the real machine video $S8a$ and the movable information video $S7m$ superimposed on each other. The real machine video $S8a$ is a video of the real machine 3 captured by the imaging means 4. The movable information video $S7m$, which is generated by the video model generation unit 14, is a video of the movable range S3. In the case of FIG. $12(f)$, the movable information video $S7m$ is a video of the movable range S3 which is a region surrounded by a curve interconnecting four constraint points.

When the movable range S3 is set by the limitation unit 11m, the video model generation unit 14 identifies the movable range S3 as being a set of straight lines interconnecting four constraint points. As a result, the movable information video S7g is generated. The same applies where the movable range S3 is set by the limitation units 11n to 11p.

In a case where the movable range S3 is set in the fourth mode, the effect in the third mode is achieved, and the degree of freedom in setting the movable range S3 increases as well.

Figure 13:
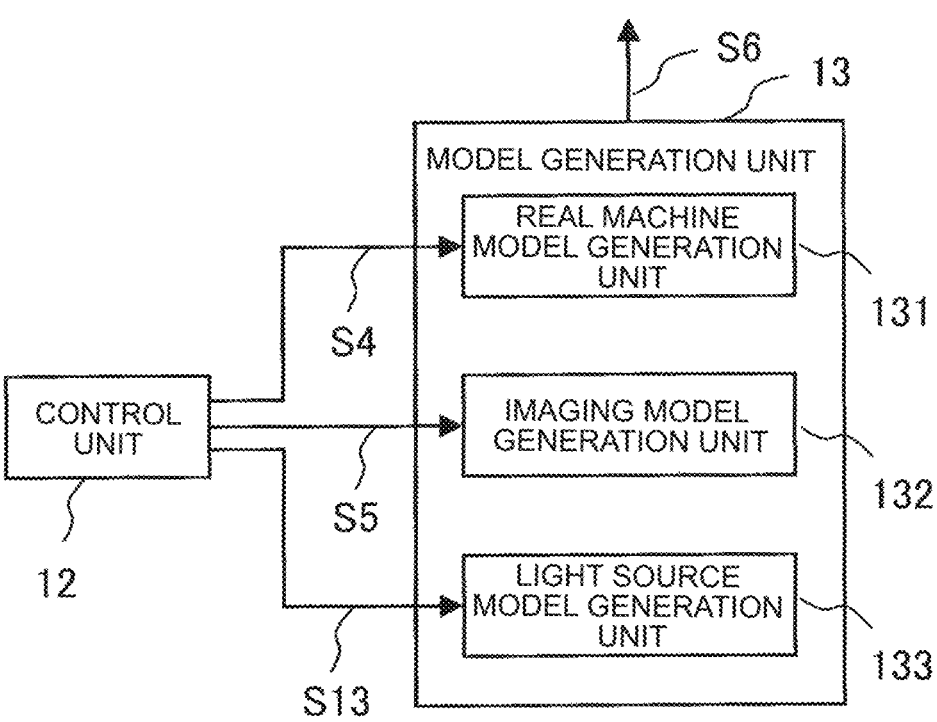
FIG. 13 is a schematic diagram illustrating an example of a configuration of a model generation unit in a case where the movable range is to be set in a fifth mode in the first embodiment.

Next, the fifth mode will be described in detail. FIG. 13 is a block diagram illustrating an example of a configuration of the model generation unit 13 in a case where the movable range S3 is set in the fifth mode in the first embodiment. In the fifth mode, on the basis of the movable range S3 from the limitation unit 11, the control unit 12 further generates third command information S13 which is input information for operating a light source that emits light. The model generation unit 13 further includes the light source model generation unit 133 that generates a model of the light source, using the third command information S13, and outputs the model information S6 that is a combination of the model of the real machine 3, the model of the imaging means 4, and the model of the light source.

The model generation unit 13 generates the model information S6 on the basis of the first command information S4 from the control unit 12 to the real machine model generation unit 131, the second command information S5 from the control unit 12 to the imaging model generation unit 132, and the third command information S13 from the control unit 12 to the light source model generation unit 133. The model generation unit 13 provides the model information S6 for the video model generation unit 14. The third command information S13 is input information for operating the light source that emits light. Specifically, the third command information S13 is a power-ON/OFF switching command directed to the light source, and input information for rotating the light source in the xy plane. Inputting the third command information S13 directly to the light source model generation unit 133 makes it possible to switch ON/OFF the output of a light beam from the light source model generation unit 133 and control the rotation of the trajectory of the light beam therefrom.

Figure 14:
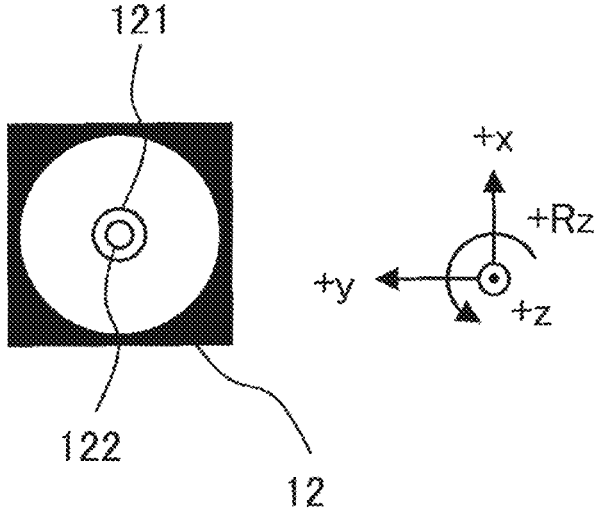
FIG. 14 is a schematic view illustrating an example of the control unit in the case of setting the movable range in the fifth mode in the first embodiment.

FIG. 14 is a schematic view illustrating an example of the control unit 12 in the case of setting the movable range S3 in the fifth mode in the first embodiment. FIG. 14 is a schematic view in a case where the control stick 121 illustrated in FIG. 3 is rotatable in an Rz direction and has a function of the limitation unit 11. The counterclockwise direction is a +Rz direction, and the clockwise direction is a −Rz direction.

When the operator rotates the control stick 121 in the xy plane and presses the button 122, a direction vector of the control stick 121 when the button 122 is pressed is set as the movable range S3. The operator may set a plurality of direction vectors. In that case, the operation of rotating the control stick 121 in the xy plane and pressing the button 122 is repeated. As a result, a plurality of direction vectors are set as the movable range S3. Alternatively, a region surrounded by a plurality of direction vectors is set as the movable range S3. The plurality of direction vectors or the region are selective in advance as the movable range S3.

Figure 15:
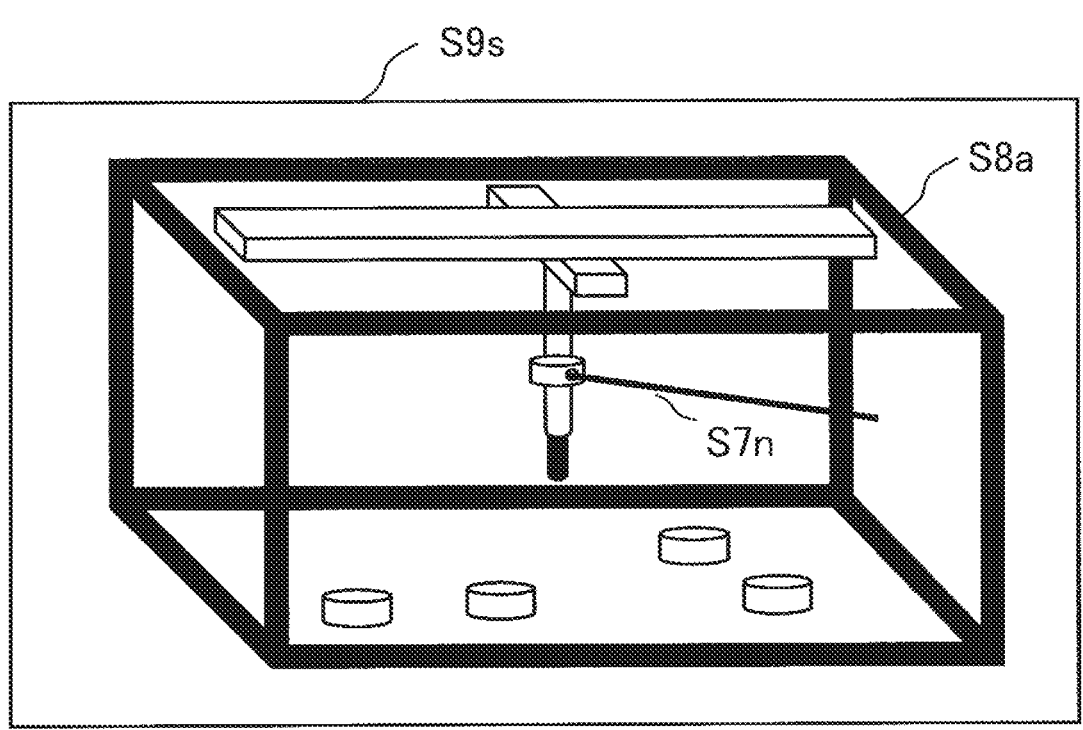
FIG. 15 is a schematic view illustrating an example of the video on the video display unit in a case where the movable range is set in the fifth mode in the first embodiment.

FIG. 15 is a schematic view illustrating an example of the video S9 on the video display unit 15 in a case where the movable range S3 is set in the fifth mode in the first embodiment. FIG. 15 is a schematic view of a video S9s in a case where the movable range S3 is set with the control stick 121.

As illustrated in FIG. 15, the video S9s is a video having the real machine video S8a and a movable information video S7n superimposed on each other. The real machine video S8a is a video of the real machine 3 captured by the imaging means 4. The movable information video S7n, which is generated by the video model generation unit 14, is a video of the movable range S3. In the case of FIG. 15, the movable information video S7n includes a video of the movable range S3 represented by a direction vector and a video of model information from the light source model generation unit 133 out of the model information S6.

Figure 16:
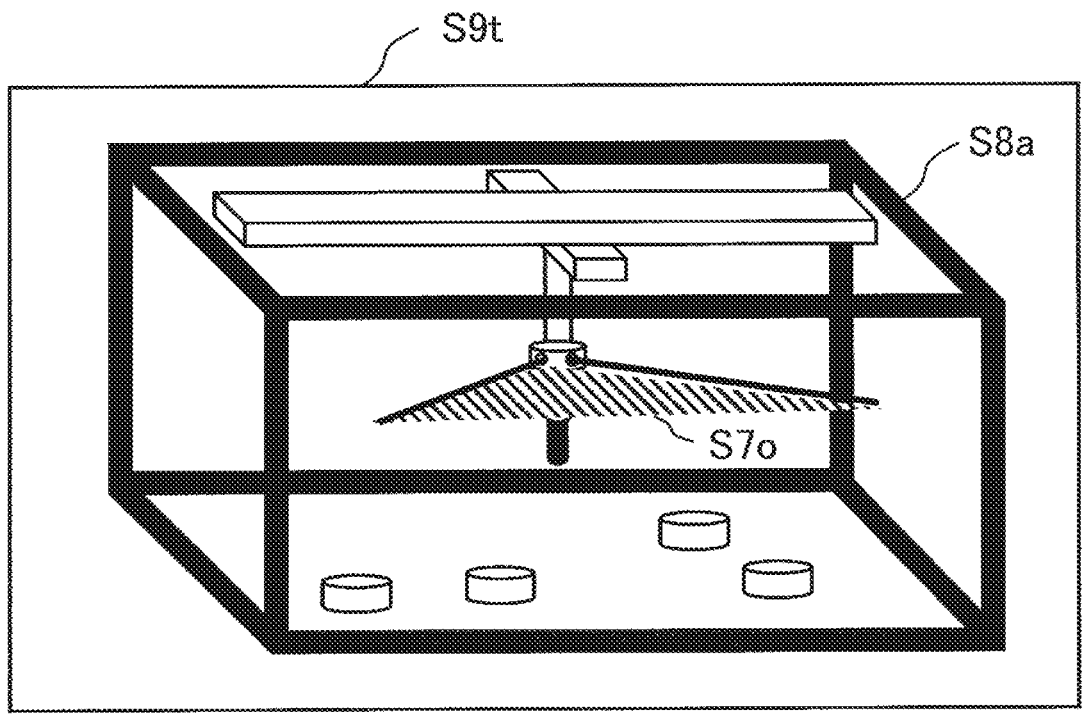
FIG. 16 is a schematic view illustrating an example of another video on the video display unit in a case where the movable range is set in the fifth mode in the first embodiment.

FIG. 16 is a schematic view illustrating an example of another video S9 on the video display unit 15 in a case where the movable range S3 is set in the fifth mode in the first embodiment. FIG. 16 is a schematic view of a video S9t in a case where two direction vectors are set with the control stick 121 and a region surrounded by the two direction vectors is selected as the movable range S3.

As illustrated in FIG. 16, the video S9t is a video having the real machine video S8a and a movable information video S7o superimposed on each other. The real machine video S8a is a video of the real machine 3 captured by the imaging means 4. The movable information video S7o, which is generated by the video model generation unit 14, is a video of the movable range S3. In the case of FIG. 16, the movable information video S7o includes a video of the movable range S3 represented by a region surrounded by the two direction vectors and a video of model information from the light source model generation unit 133 out of the model information S6.

In a case where the movable range S3 is set in the fifth mode, an effect similar to the effect in the fourth mode can be obtained.

According to the first embodiment described above, the movable range S3 of the real machine 3 is set by the limitation unit 11. This makes it possible to avoid complicated remote operation of the real machine 3. In addition, the video display unit 15 generates the video S9 having the movable information video S7 and the real machine video S8 superimposed on each other, the movable information video S7 being generated on the basis of the movable range S3 from the limitation unit 11 and the model information S6 from the model generation unit 13, the real machine video S8 being generated by the imaging means 4. As a result, it is possible to remotely control the real machine 3, checking the movable range S3, and hence improve work efficiency as compared with conventional ones.

Second Embodiment

Figure 17:
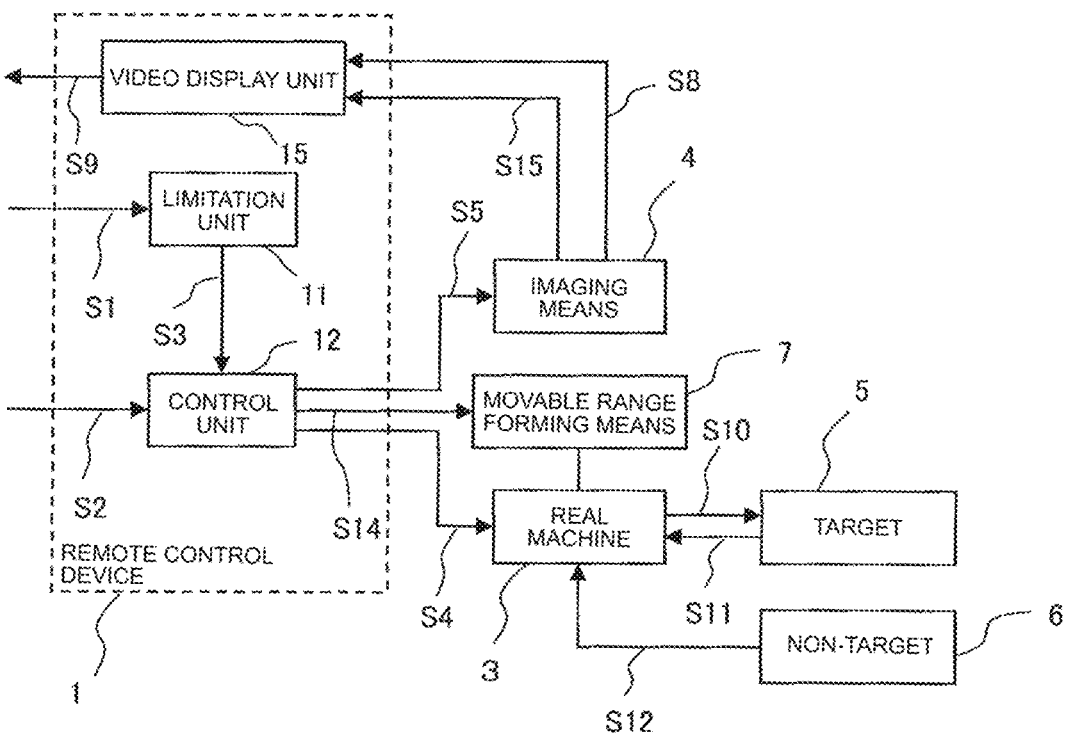
FIG. 17 is a block diagram illustrating an example of a configuration of the remote control device in a second embodiment.

FIG. 17 is a block diagram illustrating an example of a configuration of the remote control device 1 in a second embodiment.

As illustrated in FIG. 17, the remote control device 1 includes the limitation unit 11, the control unit 12, and the video display unit 15. Since the limitation unit 11, the real machine 3, the target 5, and the non-target 6 illustrated in FIG. 17 are the same as the limitation unit 11, the real machine 3, the target 5, and the non-target 6 illustrated in FIG. 1, the descriptions thereof will be omitted.

The control unit 12 receives the control information S2 from the operator and the movable range S3 from the limitation unit 11. On the basis of these pieces of information, the control unit 12 generates the first command information S4, the second command information S5, and fourth command information S14, provides the first command information S4 for the real machine 3, provides the second command information S5 for the imaging means 4, and provides the fourth command information S14 for a movable range forming means 7. The fourth command information S14 will be described later.

The video display unit 15 receives the real machine video S8 and a movable information video S15 from the imaging means 4. The video display unit 15 generates the video S9 having these videos superimposed on each other, and presents the video S9 to the operator. The movable information video S15 is a video of the movable range S3 directly captured by the imaging means 4.

The imaging means 4 receives the second command information S5 from the control unit 12. On the basis of the second command information S5, the imaging means 4 provides the real machine video S8 and the movable information video S15 for the video display unit 15.

The movable range forming means 7 forms the movable range S3 of the real machine 3. The movable range forming means 7 receives the fourth command information S14 from the control unit 12. The movable range forming means 7 is connected to the real machine 3 in FIG. 17, but may not be connected to the real machine 3 as long as the movable range S3 can be indicated in the real machine 3. The movable range forming means 7 is, for example, a light source that emits light, and is a laser light source, an LED light source, or the like. In that case, a pattern of light emitted from the light source and imaged on the real machine 3 and the periphery thereof is the movable range S3. The pattern of the light is captured by the imaging means 4 into a video, and such a video is displayed on the video display unit 15. The light source emits light having a wavelength that can be captured by the imaging means 4. For example, in a case where an infrared camera is used as the imaging means 4, the light source is a laser having a wavelength in an infrared region. The fourth command information S14 is input information for operating the movable range forming means 7 that forms the movable range S3 of the real machine 3. Specifically, the fourth command information S14 is a power ON/OFF switching command directed to the movable range forming means 7 and input information for rotating the movable range forming means 7 in the xy plane.

By capturing the movable range forming means 7, as illustrated in FIG. 17, the imaging means 4 can acquire not only the real machine video S8 but also the movable information video S15. This eliminates the necessity of the model generation unit 13 and the video model generation unit 14 for the remote control device 1 in the first embodiment.

Since the configuration including the control unit 12 in the second embodiment is the same as the configuration illustrated in FIG. 2, the description thereof will be omitted.

The control unit 12 in the second embodiment is the same as the control unit 12 illustrated in FIG. 14. That is, the control stick 121 can also rotate in the Rz direction and has the function of the limitation unit 11. A method of setting the movable range S3 is the same as the setting method described with reference to FIG. 14.

Figure 18:
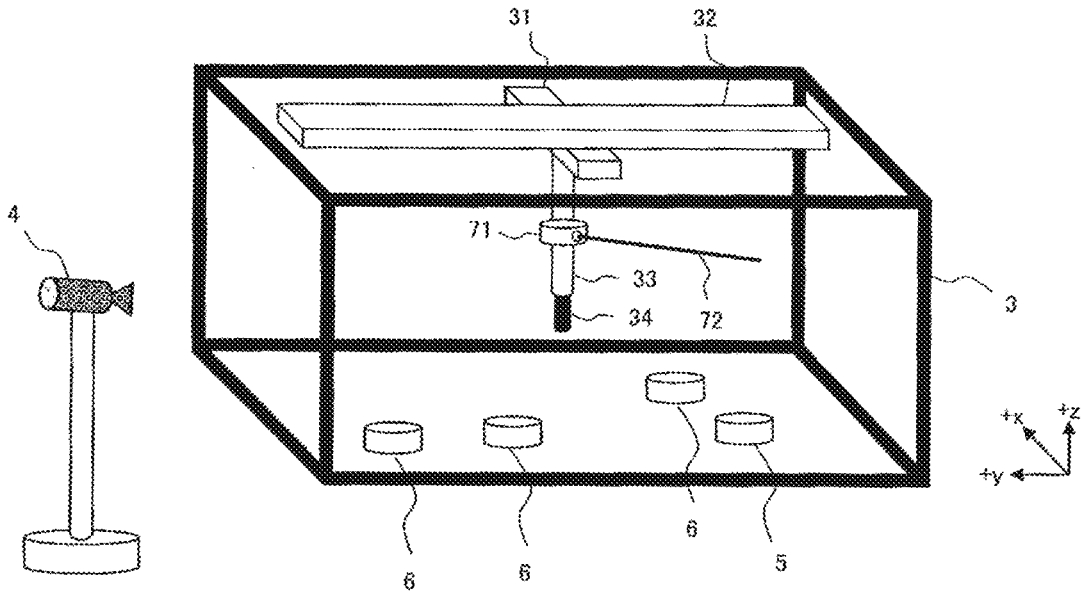
FIG. 18 is a schematic view illustrating an example of a configuration including the real machine in the second embodiment.

FIG. 18 is a schematic view illustrating an example of a configuration including the real machine 3 in the second embodiment. Since the real machine 3, the imaging means 4, the target 5, and the non-target 6 illustrated in FIG. 18 are the same as the real machine 3, the imaging means 4, the target 5, and the non-target 6 illustrated in FIG. 4, the descriptions thereof will be omitted.

As illustrated in FIG. 18, the movable range forming means 7 is connected to a vicinity of the center of the z-axis translation mechanism 33. In that case, the movable range forming means 7 is a laser light source 71, and a laser beam 72 is output from the laser light source 71. A direction of output of the laser beam 72 is set using the control stick 121. In the case of FIG. 18, the movable range forming means 7 is disposed near the center of the z-axis translation mechanism 33, but there is no limitation thereto. For example, the movable range forming means 7 may be disposed above or below the z-axis translation mechanism 33. The movable range forming means 7 may be disposed outside the real machine 3.

Figure 19:
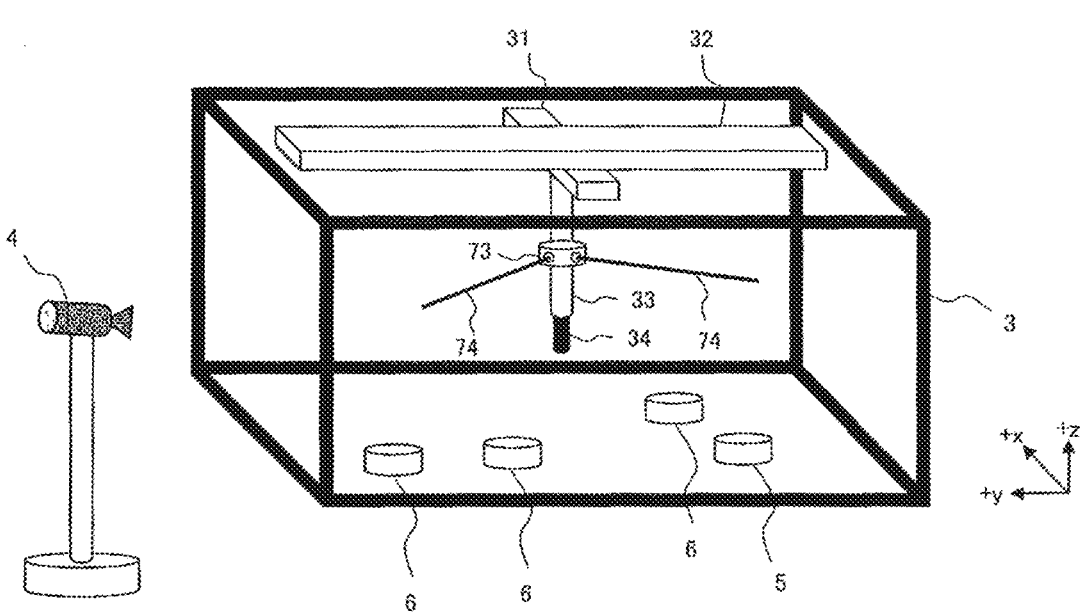
FIG. 19 is a schematic view illustrating an example of another configuration including the real machine in the second embodiment.

FIG. 19 is a schematic view illustrating an example of another configuration including the real machine 3 in the second embodiment. Since the real machine 3, the imaging means 4, the target 5, and the non-target 6 illustrated in FIG. 19 are the same as the real machine 3, the imaging means 4, the target 5, and the non-target 6 illustrated in FIG. 4, the descriptions thereof will be omitted.

As illustrated in FIG. 19, the movable range forming means 7 is connected to a vicinity of the center of the z-axis translation mechanism 33. In that case, the movable range forming means 7 is a multi-laser light source 73, and a multi-laser beam 74 is output therefrom. A direction of output of the multi-laser beam 74 is set using the control stick 121. In the case of FIG. 19, the movable range forming means 7 is disposed near the center of the z-axis translation mechanism 33, but there is no limitation thereto. For example, the movable range forming means 7 may be disposed above or below the z-axis translation mechanism 33. The movable range forming means 7 may be disposed outside the real machine 3.

In a case where the movable range forming means 7 is the laser light source illustrated in FIG. 18, when the operator rotates the control stick 121 in the xy plane and presses the button 122, a direction vector of the control stick 121 when the button 122 is pressed is set as the movable range S3.

In a case where the movable range forming means 7 is the multi laser light source illustrated in FIG. 19, when the operator performs twice an operation of rotating the control stick 121 in the xy plane and pressing the button 122, two direction vectors are set as the movable range S3. Alternatively, a region surrounded by the two direction vectors is set as the movable range S3. The two direction vectors or the region is selective in advance as the movable range S3.

Figure 20:
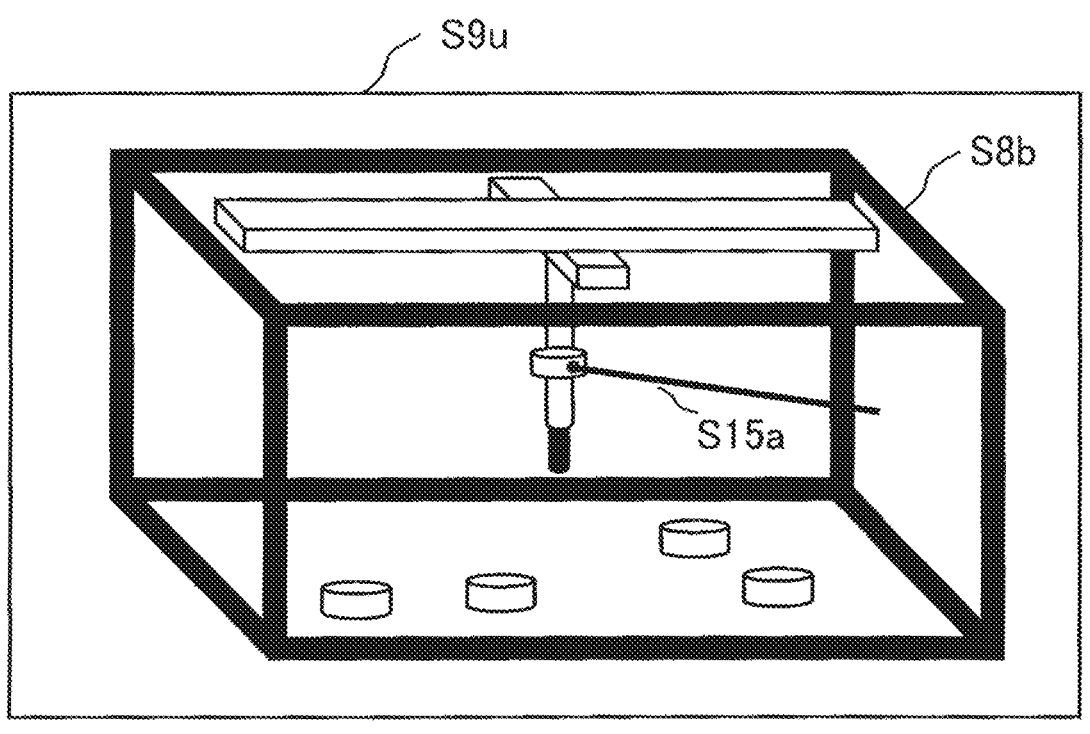
FIG. 20 is a schematic view illustrating an example of the video on the video display unit in the second embodiment.

FIG. 20 is a schematic view illustrating an example of the video S9 on the video display unit 15 in the second embodiment. FIG. 20 is a schematic view of a video S9u in a case where the movable range S3 is set with the control stick 121.

As illustrated in FIG. 20, the video S9u is a video having a real machine video S8b and a movable information video S15a superimposed on each other. The real machine video S8b is a video of the real machine 3 and the movable range forming means 7 captured by the imaging means 4. The movable information video S15a is a video of the movable range S3 captured by the imaging means 4. In the case of FIG. 20, the movable information video S15a is a video of the movable range S3 represented by a direction vector.

Figure 21:
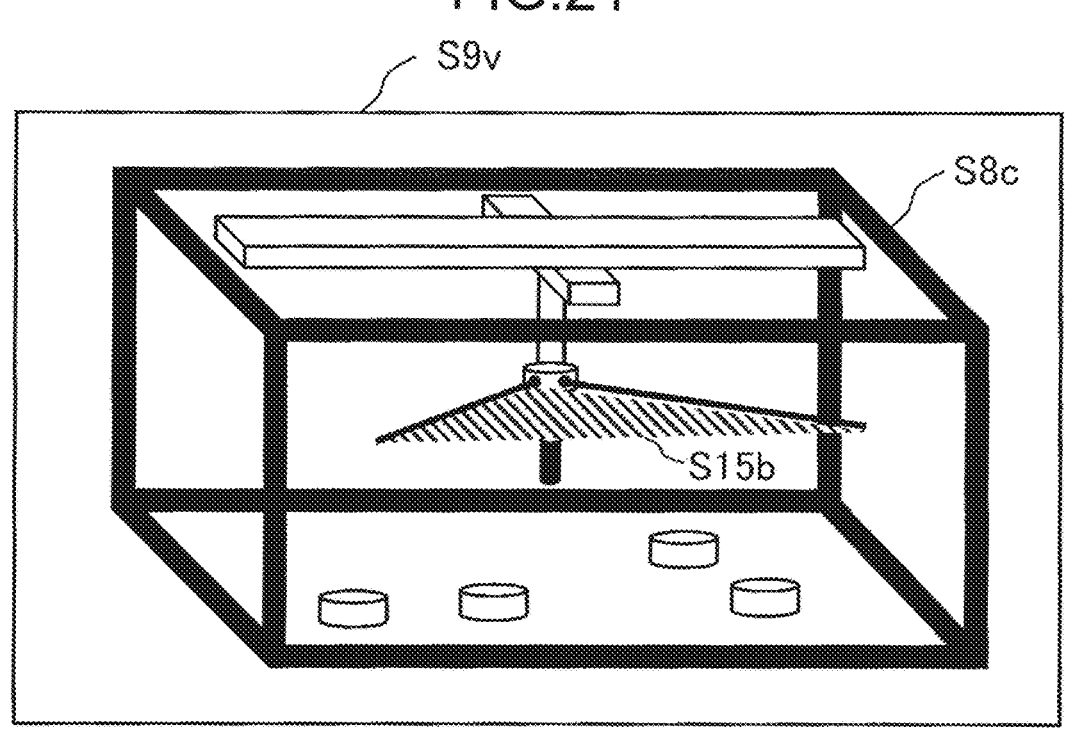
FIG. 21 is a schematic view illustrating an example of another video on the video display unit in the second embodiment.

FIG. 21 is a schematic view illustrating an example of another video S9 on the video display unit 15 in the second embodiment. FIG. 21 is a schematic view of a video S9v when two direction vectors are set with the control stick 121 and a region surrounded by these two direction vectors is selected as the movable range S3.

As illustrated in FIG. 21, the video S9v is a video having a real machine video S8c and a movable information video S15b superimposed on each other. The real machine video S8c is a video of the real machine 3 and the movable range forming means 7 captured by the imaging means 4. The movable information video S15b is a video of the movable range S3 captured by the imaging means 4. In the case of FIG. 21, the movable information video S15b is a video of the movable range S3 represented by a region surrounded by the two direction vectors.

According to the second embodiment described above, the real machine 3 is provided with the movable range forming means 7, such that both the real machine video S8 and the movable information video S15 are generated by the imaging means 4. As a result, in addition to achieving the effect obtained in the first embodiment, it is possible to eliminate the necessity of the model generation unit 13 and the video model generation unit 14 of the first embodiment.

Third Embodiment

Figure 22:
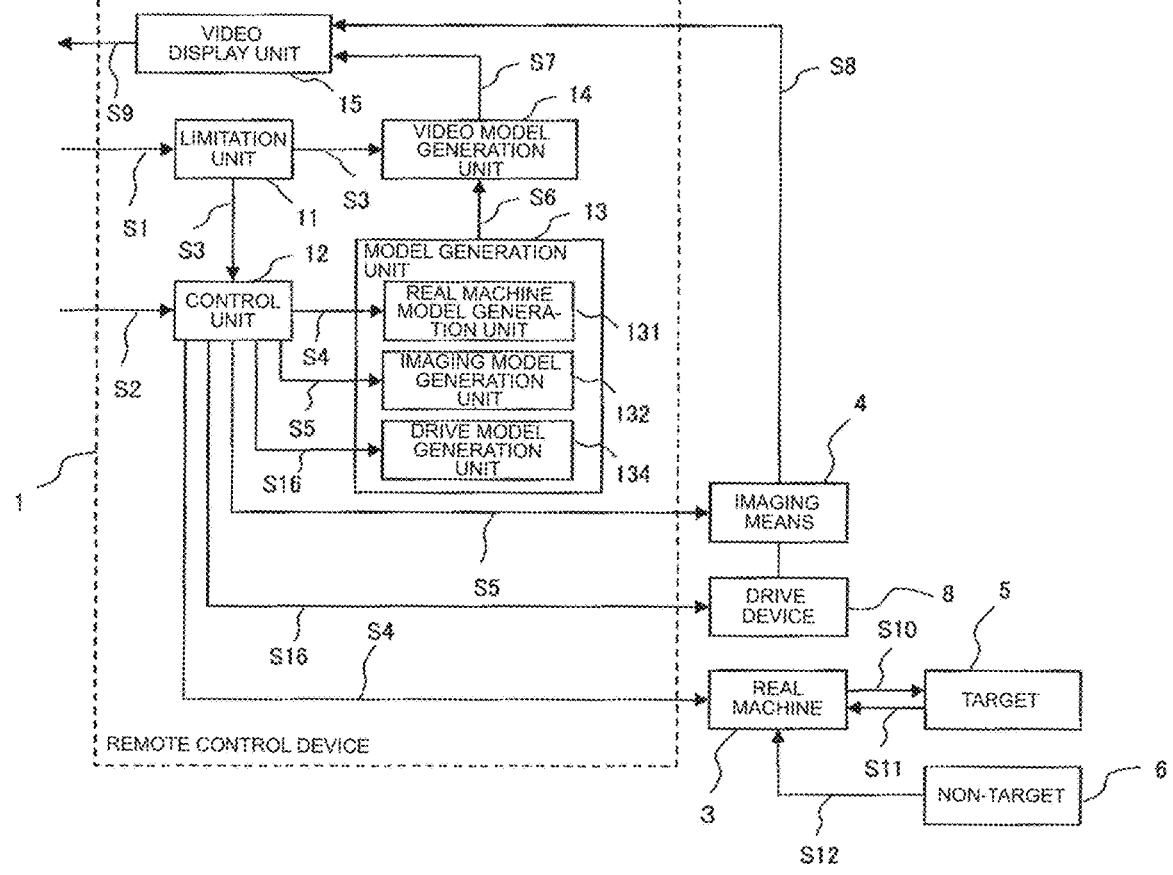
FIG. 22 is a block diagram illustrating an example of a configuration of the remote control device in a third embodiment.

FIG. 22 is a block diagram illustrating an example of a configuration of the remote control device 1 in a third embodiment.

As illustrated in FIG. 22, the remote control device 1 includes the limitation unit 11, the control unit 12, the model generation unit 13, the video model generation unit 14, and the video display unit 15. FIG. 22 is a block diagram illustrating a configuration obtained by adding a drive model generation unit 134 and a drive device 8 to the configuration of the first embodiment illustrated in FIG. 1. Since the limitation unit 11, the video model generation unit 14, the video display unit 15, the real machine 3, the imaging means 4, the target 5, and the non-target 6 illustrated in FIG. 22 are the same as the limitation unit 11, the video model generation unit 14, the video display unit 15, the real machine 3, the imaging means 4, the target 5, and the non-target 6 illustrated in FIG. 1, the descriptions thereof will be omitted.

The control unit 12 receives the control information S2 from the operator and the movable range S3 from the limitation unit 11. On the basis of these pieces of information, the control unit 12 generates the first command information S4, the second command information S5, and fifth command information S16, provides the first command information S4 to the real machine 3 and the real machine model generation unit 131, provides the second command information S5 for the imaging means 4 and the imaging model generation unit 132, and provides the fifth command information S16 for the drive device 8 and the drive model generation unit 134. The fifth command information S16 will be described later.

The model generation unit 13 further includes the drive model generation unit 134 that generates a model of the drive device 8 that, drives the imaging means 4, using the fifth command information S16 generated by the control unit 12. The model generation unit 13 generates the model information S6 on the basis of the first command information S4 from the control unit 12 to the real machine model generation unit 131, the second command information S5 from the control unit 12 to the imaging model generation unit 132, and the fifth command information S16 from the control unit 12 to the drive model generation unit 134. The model generation unit 13 provides the model information S6 for the video model generation unit 14. The fifth command information S16 is input information for operating the drive device 8 that drives the imaging means 4. Specifically, the fifth command information S16 is control information for controlling the drive device 8.

The drive device 8 is connected to the imaging means 4 and receives the fifth command information S16 from the control unit 12. The drive device 8 rotates on the basis of the fifth command information S16. As a result, the orientation of the imaging means 4 is changed, and thus a direction in which the real machine 3 is captured can be changed.

In the present embodiment, in a case where the movable range S3 is set in the fifth mode of the first embodiment, it is only required to add the light source model generation unit 133 illustrated in FIG. 13 to the model generation unit 13 in FIG. 22. In that case, the model generation unit 13 outputs the model information S6 that is a combination of the model of the real machine 3, the model of the imaging means 4, the model of the light source, and the model of the drive device 8. The model generation unit 13 in the present embodiment, which is only required to include the real machine model generation unit 131, the imaging model generation unit 132, and the drive model generation unit 134, is not necessarily required to include the light source model generation unit 133. In addition, the model information S6, which is only required to be a combination of the model of the real machine 3, the model of the imaging means 4, and the model of the drive device 8, is not necessarily required to include the model of the light source in that combination.

Figure 23:
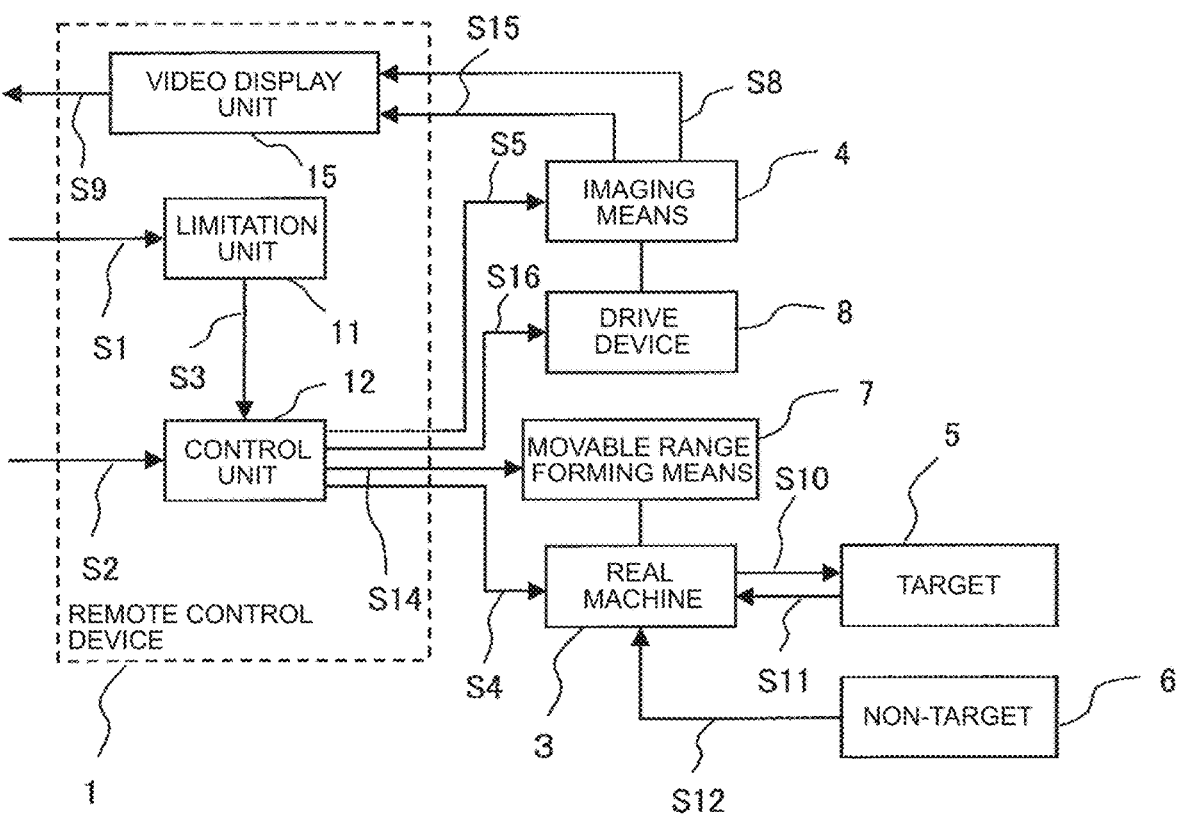
FIG. 23 is a block diagram illustrating an example of another configuration of the remote control device in the third embodiment.

FIG. 23 is a block diagram illustrating an example of another configuration of the remote control device 1 in the third embodiment.

As illustrated in FIG. 23, the remote control device 1 includes the limitation unit 11, the control unit 12, and the video display unit 15. FIG. 23 is a block diagram illustrating a configuration obtained by adding the drive device 8 to the configuration of the second embodiment illustrated in FIG. 17. Since the limitation unit 11, the video display unit 15, the real machine 3, the imaging means 4, the target 5, the non-target 6, and the movable range forming means 7 illustrated in FIG. 23 are the same as the limitation unit 11, the video display unit 15, the real machine 3, the imaging means 4, the target 5, the non-target 6, and the movable range forming means 7 illustrated in FIG. 17, the descriptions thereof will be omitted. In addition, since the drive device 8 illustrated in FIG. 23 is the same as the drive device 8 illustrated in FIG. 22, the description thereof will be omitted.

The control unit 12 receives the control information S2 from the operator and the movable range S3 from the limitation unit 11. On the basis of these pieces of information, the control unit 12 generates the first command information S4, the second command information S5, the fourth command information S14, and the fifth command information S16, provides the first command information S4 for the real machine 3, provides the second command information S5 for the imaging means 4, provides the fourth command information S14 for the movable range forming means 7, and provides the fifth command information S16 for the drive device 8.

Since the configuration including the control unit 12 in the third embodiment is the same as the configuration illustrated in FIG. 2, the description thereof will be omitted.

The control unit 12 in the third embodiment is the same as the control unit 12 illustrated in FIG. 3. By switching between a mode in which the orientation of the imaging means 4 is changed and a mode in which the real machine 3 is remotely controlled, the operator can remotely control the real machine 3, adjusting the orientation of the imaging means 4. The switching between the two modes is performed with a means not illustrated. To change the orientation of the imaging means 4, the control stick 121 is operated in the x-axis direction or the y-axis direction. As a result, the orientation of the imaging means 4 is changed in the x-axis direction or the y-axis direction.

Figure 24:
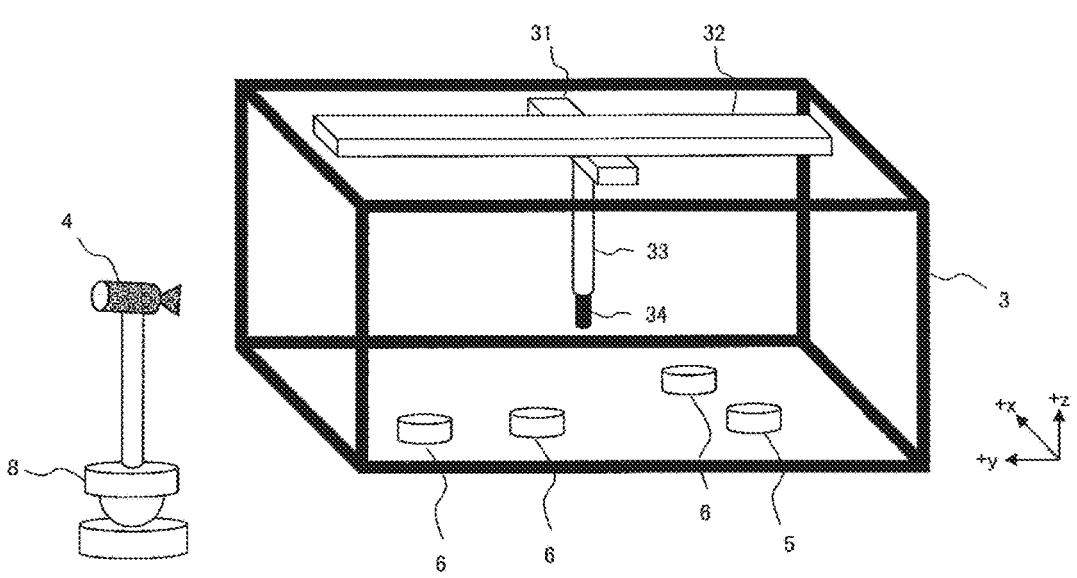
FIG. 24 is a schematic view illustrating an example of a configuration including the real machine in the third embodiment.

FIG. 24 is a schematic view illustrating an example of a configuration including the real machine 3 in the third embodiment. FIG. 24 is a schematic view when the real machine 3 is operated using the remote control device 1 illustrated in FIG. 22. Since the real machine 3, the imaging means 4, the target 5, and the non-target 6 illustrated in FIG. 24 are the same as the real machine 3, the imaging means 4, the target 5, and the non-target 6 illustrated in FIG. 4, the descriptions thereof will be omitted.

The drive device 8 is connected to the imaging means 4, and changes the orientation of the imaging means 4 on the basis of the fifth command information S16 from the control unit 12. The orientation of the real machine video S8 on the video display unit 15 is switched depending on the orientation of the imaging means 4.

According to the third embodiment described above, the orientation of the imaging means 4 is changed by the drive device 8. This makes it possible not only to achieve the effect obtained in the second embodiment, but also to allow the operator to operate the real machine 3, sequentially changing the orientation of the real machine video S8, such that the operator can efficiently perform the remote operation.

Fourth Embodiment

Figures 25, 26:
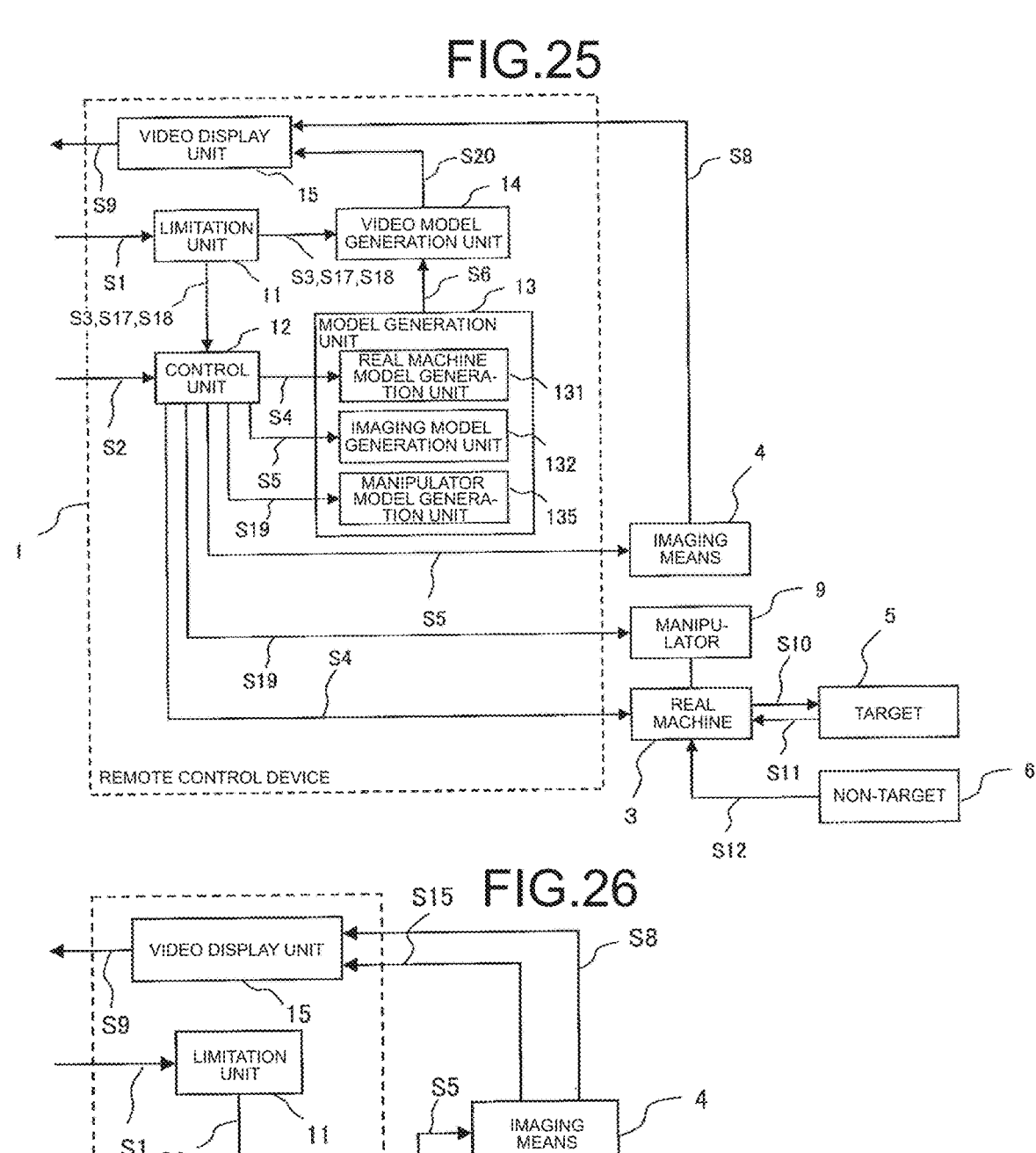
FIG. 25 is a block diagram illustrating an example of a configuration of the remote control device in a fourth embodiment.
FIG. 26 is a block diagram illustrating an example of another configuration of the remote control device in the fourth embodiment.

FIG. 25 is a block diagram illustrating an example of a configuration of the remote control device 1 in a fourth embodiment.

As illustrated in FIG. 25, the remote control device 1 includes the limitation unit 11, the control unit 12, the model generation unit 13, the video model generation unit 14, and the video display unit 15. FIG. 25 is a block diagram illustrating a configuration obtained by adding a manipulator model generation unit 135 and a manipulator 9 to the configuration of the first embodiment illustrated in FIG. 1. Since the real machine 3, the imaging means 4, the target 5, and the non-target 6 illustrated in FIG. 25 are the same as the real machine 3, the imaging means 4, the target 5, and the non-target 6 illustrated in FIG. 1, the descriptions thereof will be omitted.

The limitation unit 11 receives the limitation information S1 from the operator. The limitation unit 11 generates the movable range S3, an openable/closable range S17, and a posture restriction range S18 on the basis of the limitation information S1, and provides the movable range S3, the openable/closable range S17, and the posture restriction range S18 for the control unit 12 and the video model generation unit 14. The openable/closable range S17 is a range in which the manipulator 9 can be opened and closed. The posture restriction range S18 is a posture when the manipulator 9 is restricted to a predetermined posture. In other words, the posture restriction range S18 is an inclination when the manipulator 9 is restricted to a predetermined inclination.

The control unit 12 receives the control information S2 from the operator, the movable range S3 from the limitation unit 11, the openable/closable range S17 from the limitation unit 11, and the posture restriction range S18 from the limitation unit 11. On the basis of these pieces of information, the control unit 12 generates the first command information S4, the second command information S5, and sixth command information S19, provides the first command information S4 for the real machine 3 and the real machine model generation unit 131, provides the second command information S5 for the imaging means 4 and the imaging model generation unit 132, and provides the sixth command information S19 for the manipulator 9 and the manipulator model generation unit 135. The sixth command information S19 is input information for operating the manipulator 9 connected to the real machine 3. Specifically, the sixth command information S19 is information input to a driver IC, a microcomputer, or the like that moves the manipulator 9.

The model generation unit 13 further includes the manipulator model generation unit 135 that generates a model of the manipulator 9, using the sixth command information S19 generated by the control unit 12. The model generation unit 13 generates the model information S6 on the basis of the first command information S4 from the control unit 12 to the real machine model generation unit 131, the second command information S5 from the control unit 12 to the imaging model generation unit 132, and the sixth command information S19 from the control unit 12 to the manipulator model generation unit 135, and provides the model information S6 for the video model generation unit 14.

The video model generation unit 14 receives the movable range S3, the openable/closable range S17, and the posture restriction range S18 from the limitation unit, and the model information S6 from the model generation unit 13. On the basis of these pieces of information, the video model generation unit 14 generates a movable information video S20 which is a video of the movable range S3, the openable/closable range S17, and the posture restriction range S18, and provides the movable information video S20 for the video display unit 15.

The video display unit 15 receives the movable information video S20 from the video model generation unit 14 and the real machine video S8 from the imaging means 4. The video display unit 15 generates the video S9 having these videos superimposed on each other, and presents the video S9 to the operator.

The manipulator 9 is connected to the real machine 3, and receives the sixth command information S19 from the control unit 12.

In the present embodiment, in a case where the movable range S3 is set in the fifth mode in the first embodiment, it is only required to add the light source model generation unit 133 illustrated in FIG. 13 to the model generation unit 13 in FIG. 25. In addition, the drive model generation unit 134 in the third embodiment may be added to the model generation unit 13, or the imaging means 4 may be connected to the drive device 8 to change the orientation of the imaging means. In that case, the model generation unit 13 outputs the model information S6 that is a combination of the model of the real machine 3, the model of the imaging means 4, the model of the light source, the model of the drive device 8, and the model of the manipulator 9. The model generation unit 13 in the present embodiment, which is only required to include the real machine model generation unit 131, the imaging model generation unit 132, and the manipulator model generation unit 135, is not necessarily required to include the light source model generation unit 133 and the drive model generation unit 134. In addition, the model information S6, which is only required to be a combination of the model of the real machine 3, the model of the imaging means 4, and the model of the manipulator 9, is not necessarily required to include the model of the light source and the model of the drive device 8 in that combination.

FIG. 26 is a block diagram illustrating an example of another configuration of the remote control device 1 in the fourth embodiment.

As illustrated in FIG. 26, the remote control device 1 includes the limitation unit 11, the control unit 12, and the video display unit 15. FIG. 26 is a block diagram illustrating a configuration obtained by adding the manipulator 9 to the configuration of the second embodiment illustrated in FIG. 17. Since the limitation unit 11, the video display unit 15, the real machine 3, the imaging means 4, the target 5, the non-target 6, and the movable range forming means 7 illustrated in FIG. 26 are the same as the limitation unit 11, the video display unit 15, the real machine 3, the imaging means 4, the target 5, the non-target 6, and the movable range forming means 7 illustrated in FIG. 17, the descriptions thereof will be omitted. In addition, since the manipulator 9 illustrated in FIG. 26 is the same as the manipulator 9 illustrated in FIG. 25, the description thereof will be omitted.

The control unit 12 receives the control information S2 from the operator and the movable range S3 from the limitation unit 11. On the basis of these pieces of information, the control unit 12 generates the first command information S4, the second command information S5, the fourth command information S14, and the sixth command information S19, provides the first command information S4 to the real machine 3, provides the second command information S5 for the imaging means 4, provides the fourth command information S14 for the movable range forming means 7, and provides the sixth command information S19 for the manipulator 9.

As illustrated in FIG. 26, the limitation unit 11 generates only the movable range S3 unlike the limitation unit 11 illustrated in FIG. 25. That is, the openable/closable range S17 and the posture restriction range S18 of the manipulator 9 are not generated. Alternatively, similarly to FIG. 25, the limitation unit 11 may generate not only the movable range S3 but also the openable/closable range S17 and the posture restriction range S18 of the manipulator 9, provided that a means for indicating an openable/closable range (not illustrated) and a means for indicating a posture restriction range (not illustrated) are required and the control unit 12 generates command information therefor.

In FIG. 26, the imaging means 4 may be connected to the drive device 8 to change the orientation of the imaging means. In that case, the control unit 12 generates the first command information S4 directed to the real machine 3, the second command information S5 directed to the imaging means 4, the fourth command information S14 directed to the movable range forming means 7, the fifth command information S16 directed to the drive device 8, and the sixth command information S19 directed to the manipulator 9.

Since the configuration including the control unit 12 in the fourth embodiment is the same as the configuration illustrated in FIG. 2, the description thereof will be omitted.

The control unit 12 in the fourth embodiment is the same as the control unit 12 illustrated in FIG. 3. In addition, the control stick 121 has the function of the limitation unit 11. In remotely operating the real machine 3, the control stick 121 may be rotated being positioned at the center of the control unit 12, thereby opening and closing the manipulator 9.

Figure 27:
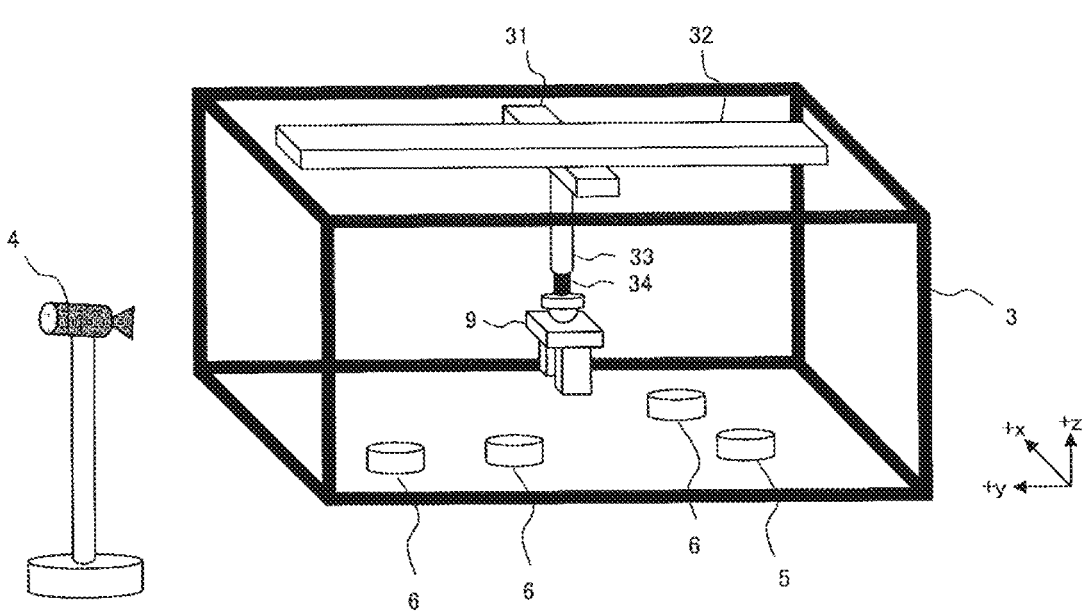
FIG. 27 is a schematic view illustrating an example of a configuration including the real machine in the fourth embodiment.

FIG. 27 is a schematic view illustrating an example of a configuration including the real machine 3 in the fourth embodiment. FIG. 27 is a schematic view when the real machine 3 is operated using the remote control device 1 illustrated in FIG. 25. Since the real machine 3, the imaging means 4, the target 5, and the non-target 6 illustrated in FIG. 27 are the same as the real machine 3, the imaging means 4, the target 5, and the non-target 6 illustrated in FIG. 4, the descriptions thereof will be omitted.

The manipulator 9 is pivotably connected to the real machine end 34. The openable/closable range S17 and the posture restriction range S18 of the manipulator 9 are set by the limitation unit 11 and the control stick 121.

Figure 28:
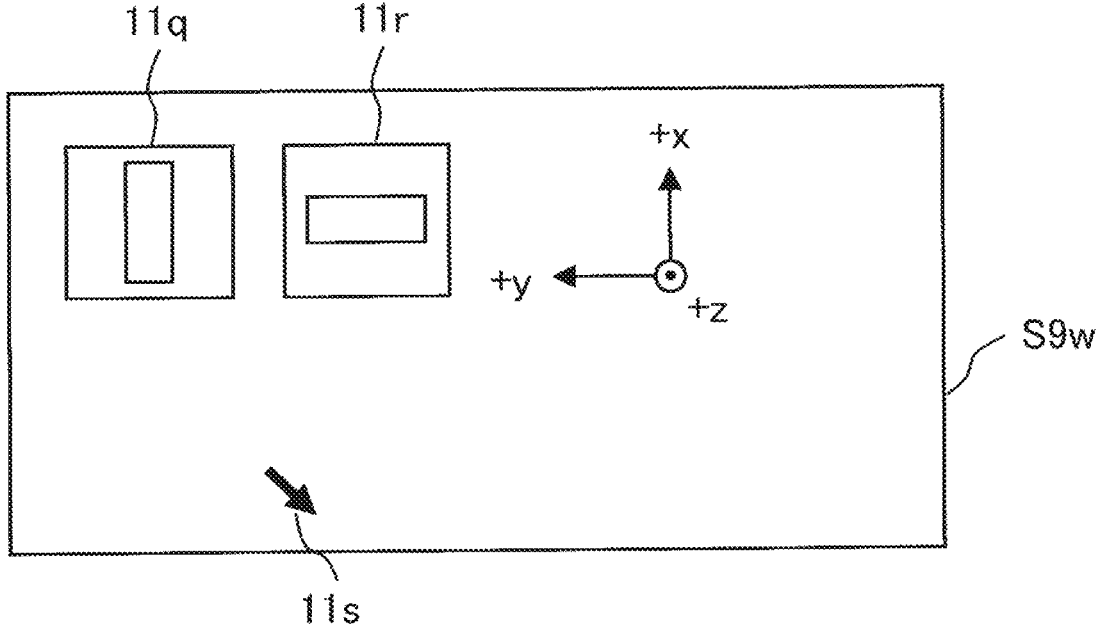
FIG. 28 is a schematic view illustrating an example of the limitation unit in the fourth embodiment.

FIG. 28 is a schematic view illustrating an example of the limitation unit 11 in the fourth embodiment. FIG. 28 is a schematic view when the real machine 3 is operated using the remote control device 1 illustrated in FIG. 25. In addition, FIG. 28 is a schematic view in a case where the openable/closable range S17 of the manipulator 9 is set in a mode similar to the third mode in the first embodiment.

As illustrated in FIG. 28, a video S9$w$ from the video display unit 15 displays limitation patterns 11$q$ and 11$r$. The limitation patterns 11$q$ and 11$r$ are openable/closable patterns of the manipulator 9 prepared in advance. Before remotely operating the real machine 3, the operator sets the movable range S3 of the real machine 3 in any mode, and selects the limitation pattern 11$q$ or 11$r$ as an openable/closable pattern of the manipulator 9. For example, in a case where the operator selects the restriction pattern 11$q$, the operator presses the button 122, hovering a cursor 11$s$ hovered over the restriction pattern 11$q$, using the control stick 121. As a result, the limitation unit 11 sets the openable/closable range S17 of the manipulator 9 in the x-axis direction. The openable/closable pattern is not limited to the limitation patterns 11$q$ and 11$r$, and may include an oblique pattern. In addition, the video display unit 15 may have a touch display function, and the operator may manually operate a screen to select the limitation pattern 11$q$ or 11$r$. As a result, the necessity of the cursor 11$s$ is eliminated, which enables simple operation.

In FIG. 28, the openable/closable range S17 of the manipulator 9 is set in a mode similar to the third mode in the first embodiment. However, the openable/closable range S17 of manipulator 9 may be set in a mode similar to the first mode, the second mode, the fourth mode, or the fifth mode.

Figure 29:
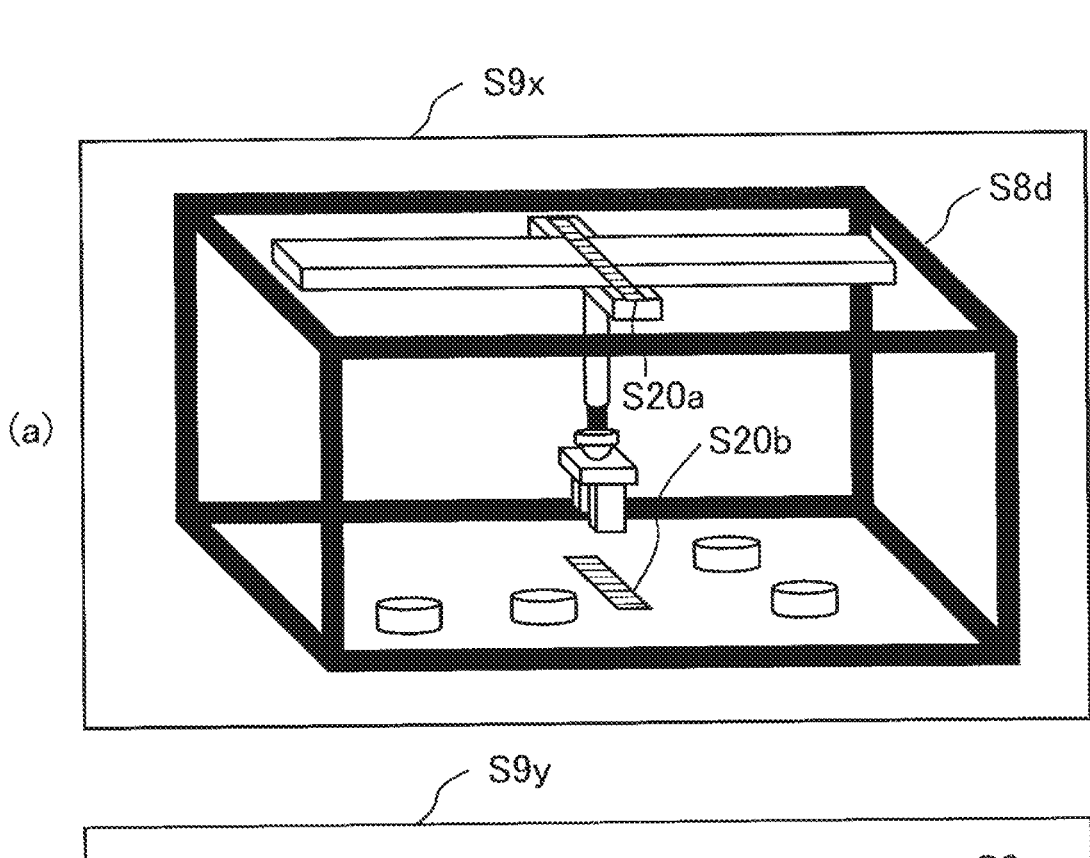
FIG. 29 is a set of schematic views each illustrating an example of the video on the video display unit in the fourth embodiment.
Figure 29:
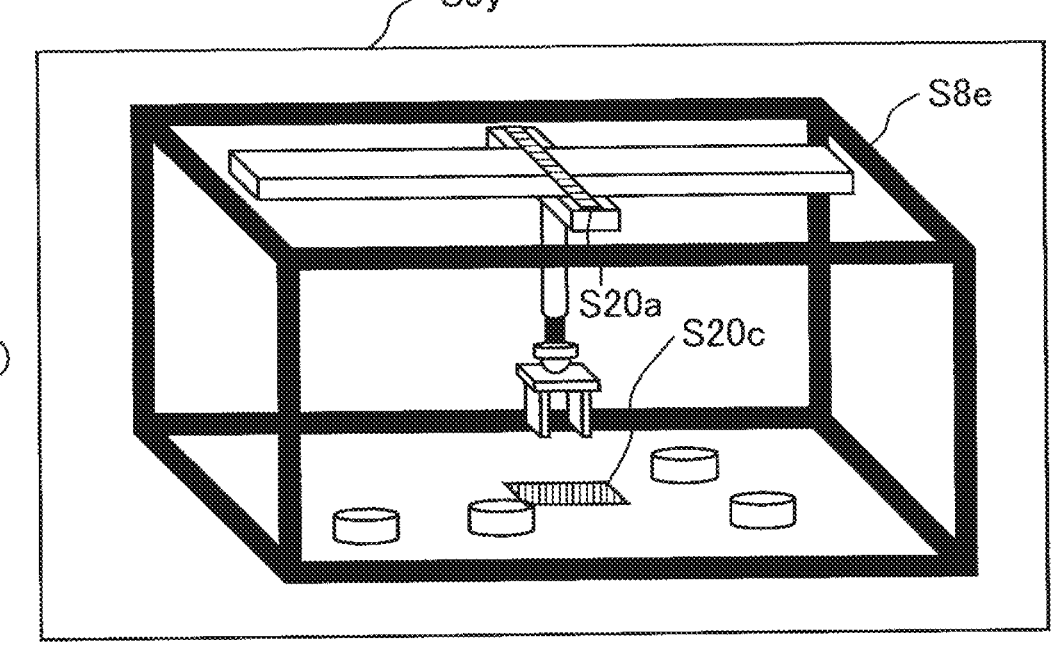

FIGS. 29($a$) and 29($b$) are schematic views each illustrating an example of the video S9 on the video display unit 15 in the fourth embodiment. FIG. 29 is a set of schematic views when the real machine 3 is operated using the remote control device 1 illustrated in FIG. 25. FIG. 29($a$) is a schematic view of a video S9$x$ in a case where the movable range S3 of the real machine 3 is set in the x-axis direction and the restriction pattern 11$q$ is selected as the openable/closable range S17 of the manipulator 9. FIG. 29($b$) is a schematic view of a video S9$y$ in a case where the movable range of the real machine 3 is set in the x-axis direction and the restriction pattern 11$r$ is selected as the openable/closable range S17 of the manipulator 9.

As illustrated in FIG. 29($a$), the video S9$x$ is a video having a real machine video S8$d$, a movable information video S20$a$, and a movable information video S20$b$ superimposed on one another. The real machine video S8$d$ is a video of the real machine 3 and the manipulator 9 captured by the imaging means 4. The movable information video S20$a$, which is generated by the video model generation unit 14, is a video of the movable range S3. The movable information video S20$b$, which is generated by the video model generation unit 14, is a video of the openable/closable range S17. In the case of FIG. 29($a$), the movable information video S20$a$ is a video of the movable range S3 in the same direction as the x-axis direction. In addition, the movable information video S20$b$ is a video of the openable/closable range S17 in the same direction as the x-axis direction.

As illustrated in FIG. 29($b$), the video S9$y$ is a video having a real machine video S8$e$, the movable information video S20$a$, and a movable information video S20$c$ superimposed on one another. The real machine video S8$e$ is a video of the real machine 3 and the manipulator 9 captured by the imaging means 4. The movable information video S20$a$, which is generated by the video model generation unit 14, is a video of the movable range S3. The movable information video S20$c$, which is generated by the video model generation unit 14, is a video of the openable/closable range S17. In the case of FIG. 29($b$), the movable information video S20$a$ is a video of the movable range S3 in the same direction as the x-axis direction. In addition, the movable information video S20$c$ is a video of the openable/closable range S17 in the same direction as the y-axis direction.

In FIGS. 29($a$) and 29($b$), the movable information video S20$a$ is displayed on an upper side in the real machine videos S8$d$ and S8$e$, and the movable information videos S20$b$ and S20$c$ are displayed on a lower side in the real machine videos S8$d$ and S8$e$, but there is no limitation on where to display these videos.

Next, a method for setting the posture restriction range S18 of the manipulator 9, in addition to the openable/closable range S17 thereof, will be described. Before remotely operating the real machine 3, the operator sets the movable range S3 of the real machine 3 in any mode, sets the openable/closable range S17 of the manipulator 9 in any mode, and sets the posture restriction range S18 of the manipulator 9 with the control stick 121. The operator sets the posture restriction range S18 by moving the control stick 121 in the x-axis direction or the y-axis direction.

Figure 30:
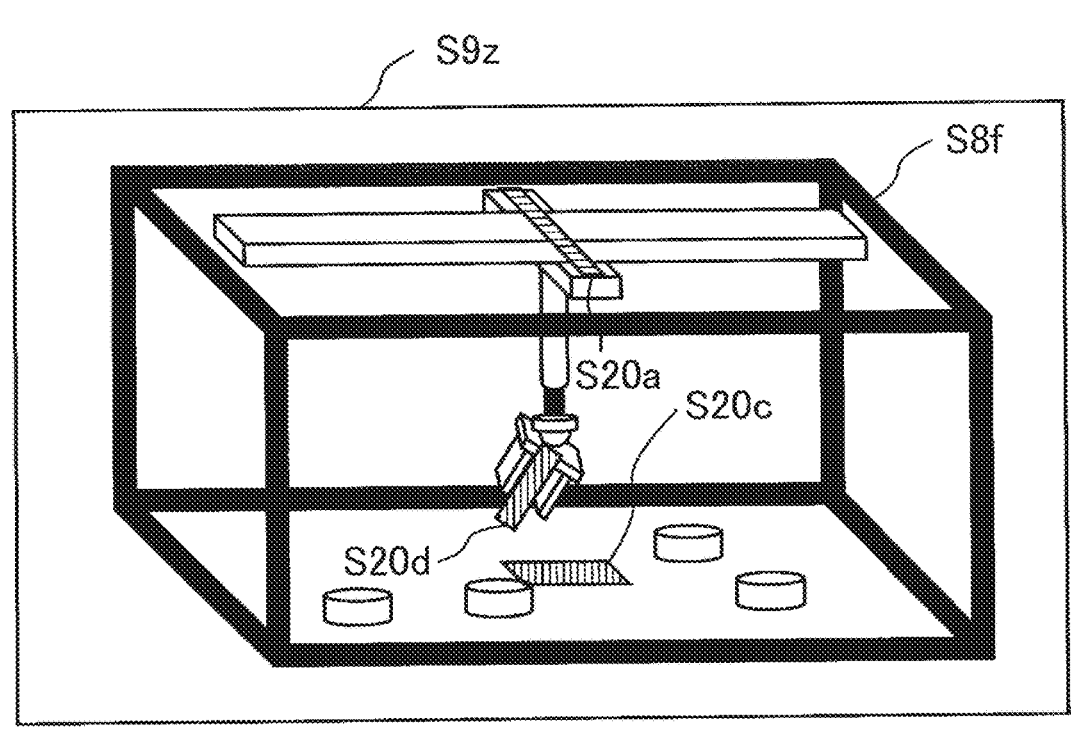
FIG. 30 is a schematic view illustrating an example of another video on the video display unit in the fourth embodiment.

FIG. 30 is a schematic view illustrating an example of another video S9 on the video display unit 15 in the fourth embodiment. FIG. 30 is a schematic view when the real machine 3 is operated using the remote control device 1 illustrated in FIG. 25. FIG. 30 is a schematic view of a video S9$z$ in a case where the movable range S3 of the real machine 3 is set in the x-axis direction, the openable/closable range S17 of the manipulator 9 is set in the y-axis direction, and the posture restriction range S18 of the manipulator 9 is set in a direction oblique to the y-axis.

As illustrated in FIG. 30, the video S9$z$ is a video having a real machine video S8$f$, the movable information video S20$a$, the movable information video S20$c$, and a movable information video S20$d$ superimposed on one another. The real machine video S8$f$ is a video of the real machine 3 and the manipulator 9 captured by the imaging means 4. The movable information video S20$a$, which is generated by the video model generation unit 14, is a video of the movable range S3. The movable information video S20$c$, which is generated by the video model generation unit 14, is a video of the openable/closable range S17. The movable information video S20$d$, which is generated by the video model generation unit 14, is a video of the posture restriction range S18. In the case of FIG. 30, the movable information video S20$a$ is a video of the movable range S3 in the same direction as the x-axis direction. In addition, the movable information video S20$c$ is a video of the openable/closable range S17 in the same direction as the y-axis direction. Furthermore, the movable information video S20$d$ is a video of the posture restriction range S18 in an oblique direction.

In FIG. 30, the movable information video S20$a$ is displayed on an upper side in the real machine video S8$f$, the movable information videos S20$c$ is displayed on a lower side in the real machine videos S8$f$, and the movable information videos S20$d$ is displayed near the center in the real machine video S8$f$, but there is no limitation on where to display these videos.

According to the fourth embodiment described above, the limitation unit 11 sets not only the movable range S3 of the real machine 3 but also the openable/closable range S17 and the posture restriction range S18 of the manipulator 9. This makes it possible to not only achieve the effect obtained in the third embodiment, but also allow the operator to avoid complicated remote operation of the manipulator 9. In addition, the movable information video S20, which is a video of the openable/closable range S17 and the posture restriction range S18 of the manipulator 9, is generated by the video model generation unit 14, and the video S9 having the movable information video S20 and the real machine video S8 superimposed on each other is displayed on the video display unit 15. As a result, it is possible to operate the manipulator 9, checking the openable/closable range S17 and the posture restriction range S18 of the manipulator 9, and hence perform the remote operation efficiently.

Fifth Embodiment

Figure 31:
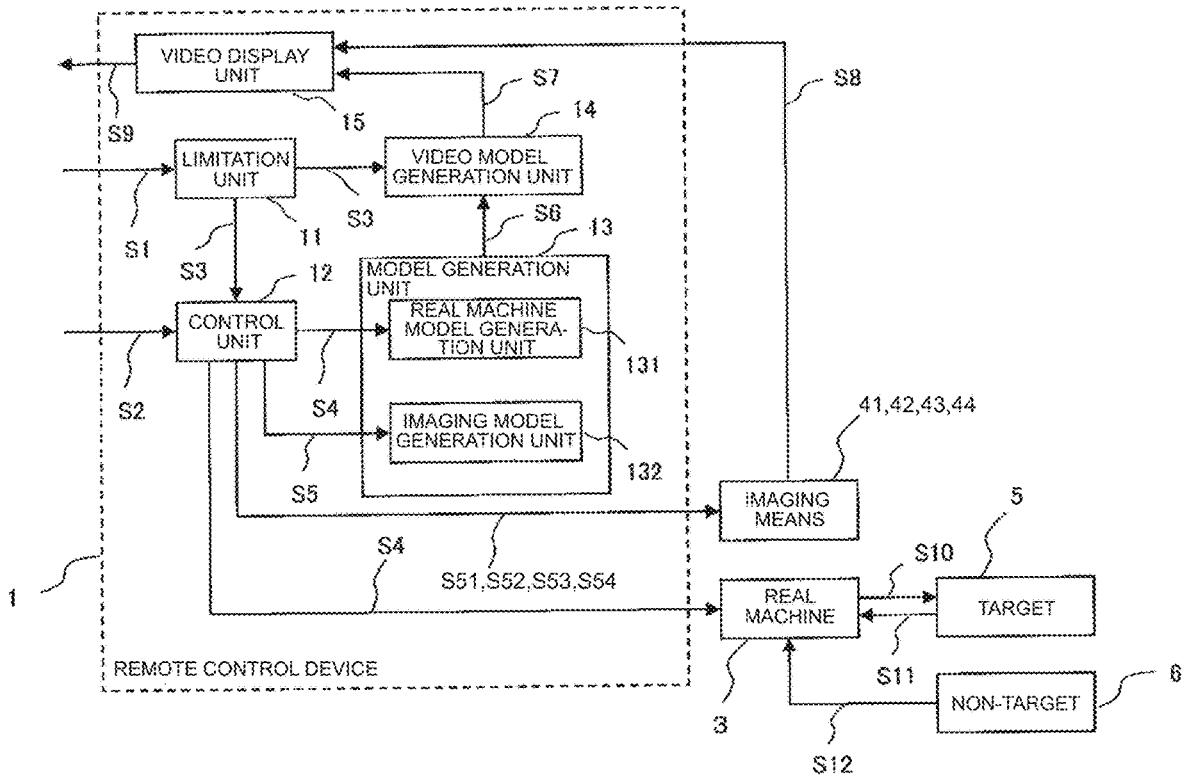
FIG. 31 is a block diagram illustrating an example of a configuration of the remote control device in a fifth embodiment.

FIG. 31 is a block diagram illustrating an example of a configuration of the remote control device 1 in a fifth embodiment.

As illustrated in FIG. 31, the remote control device 1 includes the limitation unit 11, the control unit 12, the model generation unit 13, the video model generation unit 14, and the video display unit 15. FIG. 31 is a block diagram illustrating a configuration obtained by adding four imaging means 41 to 44 to the configuration of the first embodiment illustrated in FIG. 1. Since the limitation unit 11, the model generation unit 13, the video model generation unit 14, the video display unit 15, the real machine 3, the target 5, and the non-target 6 illustrated in FIG. 31 are the same as the limitation unit 11, the model generation unit 13, the video model generation unit 14, the video display unit 15, the real machine 3, the target 5, and the non-target 6 illustrated in FIG. 1, the descriptions thereof will be omitted.

The control unit 12 receives the control information S2 from the operator and the movable range S3 from the limitation unit 11. On the basis of these pieces of information, the control unit 12 generates the first command information S4, the second command information S5, and pieces of second command information S51 to S54, provides the first command information S4 for the real machine 3 and the real machine model generation unit 131, provides the second command information S5 for the imaging model generation unit 132, and provides each of the pieces of the second command information S51 to S54 for the corresponding one of the imaging means 41 to 44. Each of the pieces of second command information S51 to S54 is an image-capturing ON/OFF switching command, a magnification adjustment command, etc. directed to the corresponding one of the imaging means 41 to 44. The control unit 12 generates the pieces of second command information S51 to S54 so that any one of the imaging means 41 to 44 is placed in an image-capturing ON state, and the others thereof are placed on image-capturing OFF states. As a result, it is possible to select an imaging means corresponding to a desired direction in which to capture images.

Alternatively, the control unit 12 may generate the pieces of second command information S51 to S54 so that a plurality of imaging means among the imaging means 41 to 44 are placed in the image-capturing ON states. As a result, in this case, a three-dimensional video, which is a combination of a plurality of videos, is generated to thereby provide the same operational feeling as that in the case of directly operating the real machine 3. That is, the control unit 12 generates command information for the imaging means 41 to 44 so as to enable at least one of the plurality of imaging means 41 to 44. The second command information S5 is the same as the command information among the second command information S51 to S54, the same command information as the second command information S5 corresponding to the imaging means set in the image-capturing ON state. In a case where there are a plurality of imaging means set in the image-capturing ON state, a plurality of pieces of the second command information S5 are generated, and a plurality of the imaging model generation units 132 are provided, as well.

Figure 39:
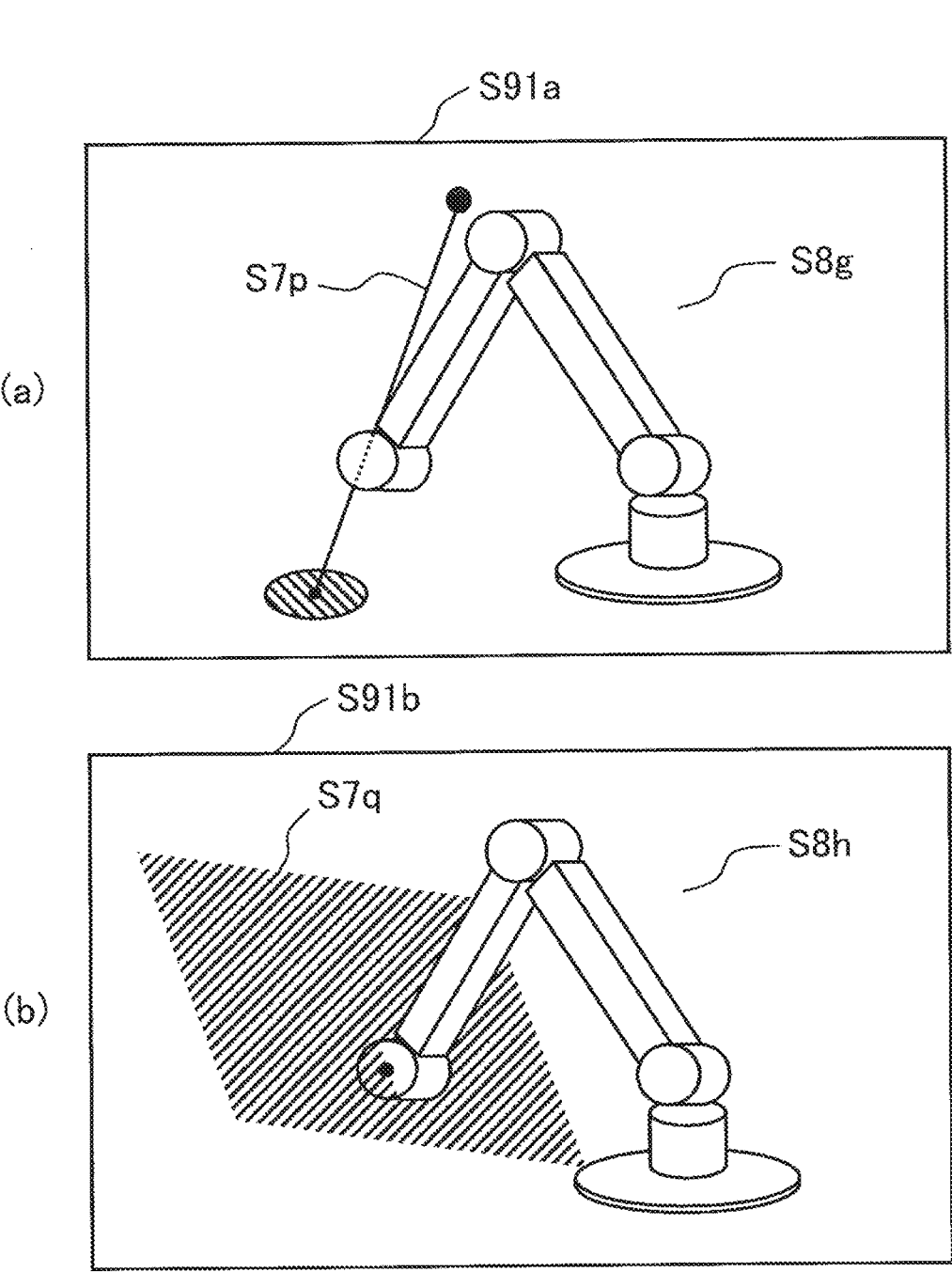
FIG. 39 is a set of schematic views each illustrating an example of the video on the video display unit in the seventh embodiment.

Each of the imaging means 41 to 44 receives, from the control unit 12, the corresponding one of pieces of second command information S51 to S54. On the basis of these pieces of information, the imaging means 41 to 44 generate the real machine video S8, and provide the real machine video S8 for the video display unit 15. Specifically, an imaging means among the imaging means 41 to 44 receives an image-capturing ON command from the control unit 12, captures the real machine video S8, and outputs the captured real machine video S8 to the video display unit 15. Although FIG. 39 illustrates the four imaging means, the number of the imaging means may be two or more.

In the present embodiment, in a case where the movable range S3 is set in the fifth mode in the first embodiment, it is only required to add the light source model generation unit 133 illustrated in FIG. 13 to the model generation unit 13 in FIG. 31. In addition, the drive model generation unit 134 in the third embodiment may be added to the model generation unit 13, or the imaging means 4 may be connected to the drive device 8 to change the orientation of the imaging means. Furthermore, the manipulator model generation unit 135 in the fourth embodiment may be added to the model generation unit 13, or the manipulator 9 may be connected to the real machine 3. In that case, the model generation unit 13 outputs the model information S6 that is a combination of the model of the real machine 3, the model of the imaging means 4, the model of the light source, the model of the drive device 8, and the model of the manipulator 9. The model generation unit 13 in the present embodiment, which is only required to include the real machine model generation unit 131 and the imaging model generation unit 132, is not necessarily required to include the light source model generation unit 133, the drive model generation unit 134, and the manipulator model generation unit 135. In addition, the model information S6, which is only required to be a combination of the model of the real machine 3 and the model of the imaging means 4, is not necessarily required to include, in that combination, the model of the light source, the model of the drive device 8, and the model of the manipulator 9.

Figure 32:
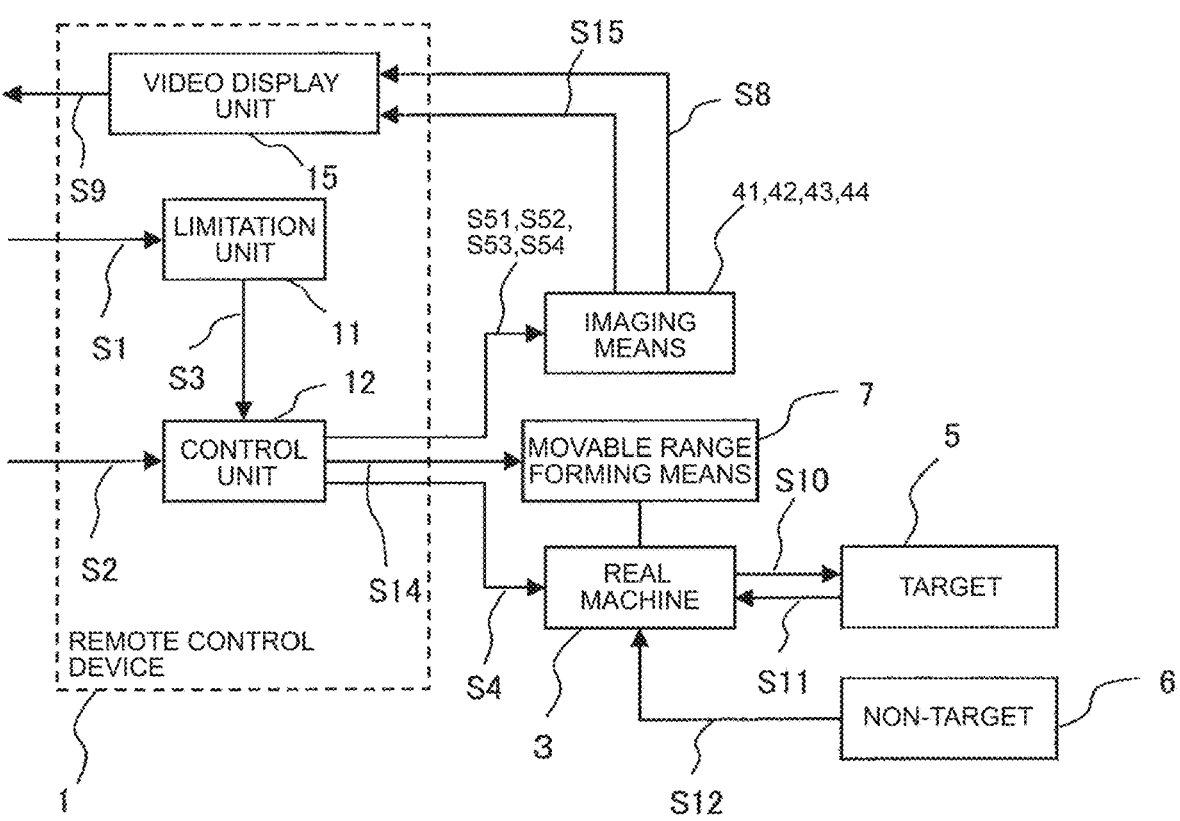
FIG. 32 is a block diagram illustrating an example of another configuration of the remote control device in the fifth embodiment.

FIG. 32 is a block diagram illustrating an example of another configuration of the remote control device 1 in the fifth embodiment.

As illustrated in FIG. 32, the remote control device 1 includes the limitation unit 11, the control unit 12, and the video display unit 15. FIG. 32 is a block diagram illustrating a configuration obtained by adding the four imaging means 41 to 44 to the configuration of the second embodiment illustrated in FIG. 17. Since the limitation unit 11, the video display unit 15, the real machine 3, the target 5, the non-target 6, and the movable range forming means 7 illustrated in FIG. 32 are the same as the limitation unit 11, the video display unit 15, the real machine 3, the target 5, the non-target 6, and the movable range forming means 7 illustrated in FIG. 17, the descriptions thereof will be omitted. In addition, since the imaging means 41 to 44 illustrated in FIG. 32 are the same as the imaging means 41 to 44 illustrated in FIG. 31, the descriptions thereof will be omitted.

The control unit 12 receives the control information S2 from the operator and the movable range S3 from the limitation unit 11. On the basis of these pieces of information, the control unit 12 generates the first command information S4, the pieces of second command information S51 to S54, and the fourth command information S14, provides the first command information S4 for the real machine 3, provides each of pieces of second command information S51 to 54 for the corresponding one of the imaging means 41 to 44, and provides the fourth command information S14 for the movable range forming means 7. The pieces of second command information S51 to S54 are the same as the pieces of second command information S51 to S54 illustrated in FIG. 31.

In FIG. 32, the imaging means 41 to 44 may be connected to the drive device 8 to change the orientations of the imaging means, and the real machine 3 may be connected to the manipulator 9. In that case, the control unit 12 generates the first command information S4 for the real machine 3, the pieces of second command information S51 to S54 for the imaging means 41 to 44, the fourth command information S14 for the movable range forming means 7, the fifth command information S16 for the drive device 8, and the sixth command information S19 for the manipulator 9.

Since the configuration including the control unit 12 in the fifth embodiment is the same as the configuration illustrated in FIG. 2, the description thereof will be omitted. In addition, since the control unit 12 in the fifth embodiment is the same as the control unit 12 illustrated in FIG. 3, the description thereof will be omitted.

Figure 33:
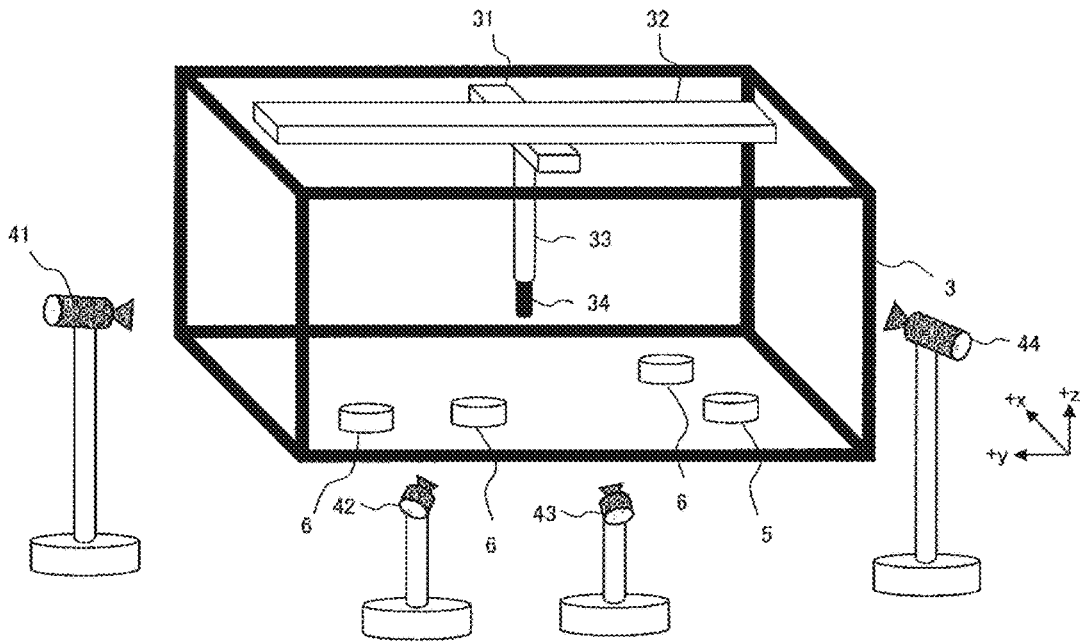
FIG. 33 is a schematic view illustrating an example of a configuration including the real machine in the fifth embodiment.

FIG. 33 is a schematic view illustrating an example of a configuration including the real machine 3 in the fifth embodiment. FIG. 33 is a schematic view when the real machine 3 is operated using the remote control device 1 illustrated in FIG. 31. Since the real machine 3, the target 5, and the non-target 6 illustrated in FIG. 33 are the same as the real machine 3, the imaging means 4, the target 5, and the non-target 6 illustrated in FIG. 4, the descriptions thereof will be omitted.

Each of the imaging means 41 to 44 is disposed in such a position that the real machine 3 is within the field of view. Drive devices 81 to 84 (not illustrated) may be connected to the imaging means 41 to 44, respectively.

Figure 34:
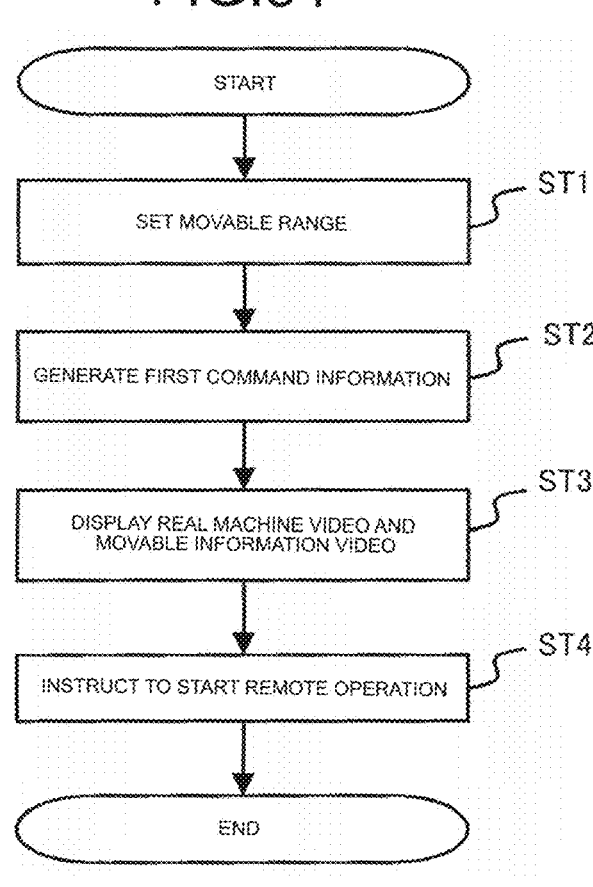
FIG. 34 is a flowchart illustrating an example of an operation of the remote control device in the first to fifth embodiments.

FIG. 34 is a flowchart illustrating an example of an operation of the remote control device 1 in the fifth embodiment. The flowchart of FIG. 34 is also applied to the remote control device 1 in the first to fourth embodiments.

Figure 35:
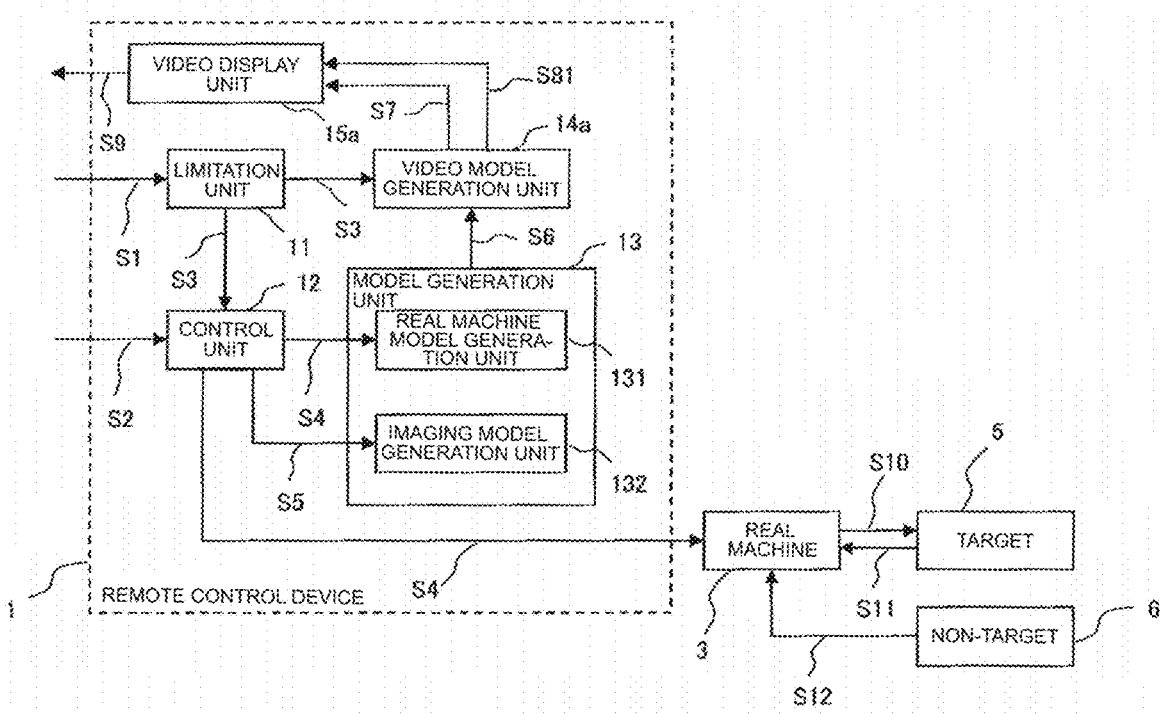
FIG. 35 is a block diagram illustrating an example of a configuration of the remote control device in a sixth embodiment.

As illustrated in FIG. 35, when the remote control device 1 is started up by a means not illustrated, the limitation unit 11 sets the movable range S3 of the real machine 3 on the basis of the limitation information S1 from the operator (step ST1).

On the basis of the control information S2 from the operator and the movable range S3 of the real machine 3, the control unit 12 generates the first command information S4 which is input information for operating the real machine 3 (step ST2).

The video display unit 15 displays the real machine video S8 from the imaging means 4 and the movable information video S7 from the video model generation unit 14 (step ST3). Alternatively, the video display unit 15 displays the real machine video S8 and the movable information video S15 from the imaging means 4. The movable information video S7 is a video of the movable range S3 from the limitation unit 11. The movable information video S15 is a video of the movable range S3 obtained by capturing the movable range forming means 7.

The means not illustrated instructs the operator to start remote operation (step ST4). The operator remotely controls the real machine 3, checking the real machine video S8 and the movable information video S7 or the real machine video S8 and the movable information video S15, all of which are displayed by the video display unit 15. The means not illustrated stops the remote control device 1 when receiving, from the operator, an instruction to end the remote operation.

According to the fifth embodiment described above, the real machine 3 is captured with any one of the plurality of imaging means enabled. This makes it possible not only to achieve the effect obtained in the fourth embodiment, but also to allow the operator to operate the real machine 3, sequentially selecting the orientation of the real machine video S8, such that the operator can efficiently perform the remote operation. In addition, the real machine 3 is captured with the plurality of imaging means enabled, and a three-dimensional video that is the combination of a plurality of videos is generated. As a result, it is possible to provide not only the effect obtained in the fourth embodiment, but also the same operational feeling as that in the case of directly operating the real machine 3.

Sixth Embodiment

FIG. 35 is a block diagram illustrating an example of a configuration of the remote control device 1 in a sixth embodiment.

As illustrated in FIG. 35, the remote control device 1 includes the limitation unit 11, the control unit 12, the model generation unit 13, a video model generation unit 14*a*, and a video display unit 15*a*. FIG. 35 is different from FIG. 1 in that the video model generation unit 14*a* outputs not only the movable information video S7 but also a real machine video S81. In addition, FIG. 35 is different from FIG. 1 in that the video display unit 15*a* receives an input of the real machine video S81 from the video model generation unit 14*a*, instead of receiving an input of the real machine video S8 from the imaging means 4. Since the limitation unit 11, the control unit 12, the model generation unit 13, the real machine 3, the target 5, and the non-target 6 illustrated in FIG. 35 are the same as the limitation unit 11, the control unit 12, the model generation unit 13, the real machine 3, the target 5, and the non-target 6 illustrated in FIG. 1, the descriptions thereof will be omitted.

The video model generation unit 14*a* receives the movable range S3 from the limitation unit 11 and the model information S6 from the model generation unit 13. On the basis of these pieces of information, the video model generation unit 14*a* generates the movable information video S7, which is a video of the movable range S3, and the real machine video S81, and provides the movable information video S7 and the real machine video S81 for the video display unit 15*a*. The real machine video S81 is, for example, a video of a three-dimensional model of the real machine 3.

The video display unit 15*a* receives the movable information video S7 and the real machine video S81 from the video model generation unit 14*a*. The video display unit 15*a* generates the video S9 on the basis of the movable information video S7 and the real machine video S81, and presents the video S9 to the operator. The video display unit 15*a* displays not the real machine video S8 which is a captured video of the real machine 3 but the real machine video S81 which is a video of the three-dimensional model of the real machine 3. When generalizing together with the first to fifth embodiments, the video display unit 15*a* displays the real machine video S81 which is a video of the real machine 3, and the movable information video S7 which is a video of the movable range S3 corresponding to the real machine 3. In the case of remotely operating the real machine 3 to move the target 5, the remote control device 1 may receive an input of a video from the imaging means 4 in order to know a positional relationship between the real machine 3 and the target 5.

Instead of displaying the captured video of the real machine 3, the video display unit 15*a* displaying, for example, the video of the three-dimensional model of the real machine 3, thereby eliminating the necessity of the imaging means 4. Even in a case where the imaging means 4 is necessary in order to know the positional relationship between the real machine 3 and the target 5, an inexpensive imaging means 4 having a low resolution suffices. This is because the real machine video S81 displayed on the video display unit 15*a* indicates the three-dimensional model of the real machine 3, which does not depend on the resolution of the imaging means 4.

Figure 36:
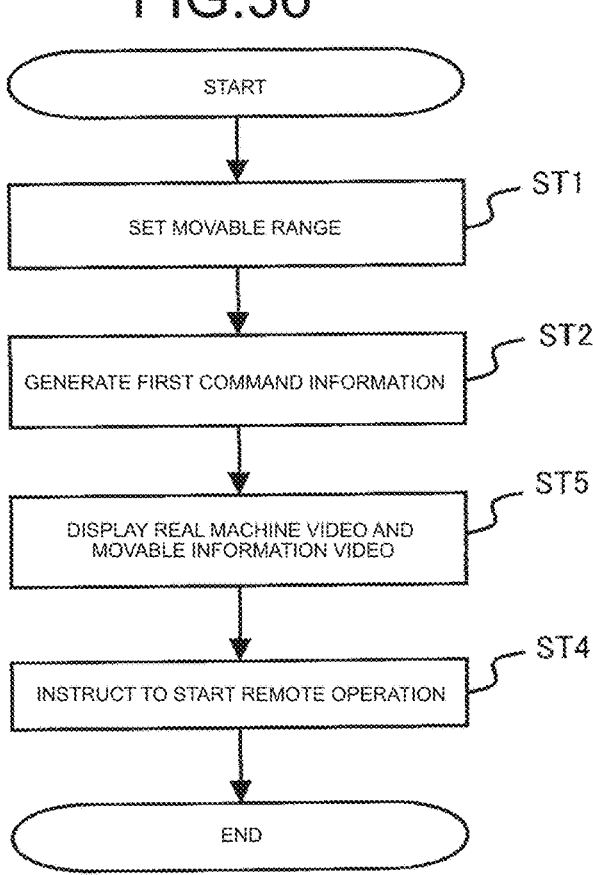
FIG. 36 is a flowchart illustrating an example of an operation of the remote control device in the sixth embodiment.

FIG. 36 is a flowchart illustrating an example of an operation of the remote control device 1 in the sixth embodiment.

As illustrated in FIG. 36, when the remote control device 1 is started up by the means not illustrated, the limitation unit 11 sets the movable range S3 of the real machine 3 on the basis of the limitation information S1 from the operator (step ST1).

On the basis of the control information S2 from the operator and the movable range S3 of the real machine 3, the control unit 12 generates the first command information S4 which is input information for operating the real machine 3 (step ST2).

The video display unit 15*a* displays the real machine video S81 and the movable information video S7 from the video model generation unit 14*a* (step ST5).

The means not illustrated instructs the operator to start remote operation (step ST4). The operator remotely controls the real machine 3, checking the real machine video S8 and the movable information video S7 displayed by the video display unit 15*a*.

According to the sixth embodiment described above, instead of displaying the video of the real machine 3, the video display unit 15*a* displaying, for example, the video of the three-dimensional model of the real machine 3, thereby eliminating the necessity of the imaging means 4. Even in a case where the imaging means 4 is necessary, an inexpensive imaging means having a low resolution suffices.

Seventh Embodiment

Figure 37:
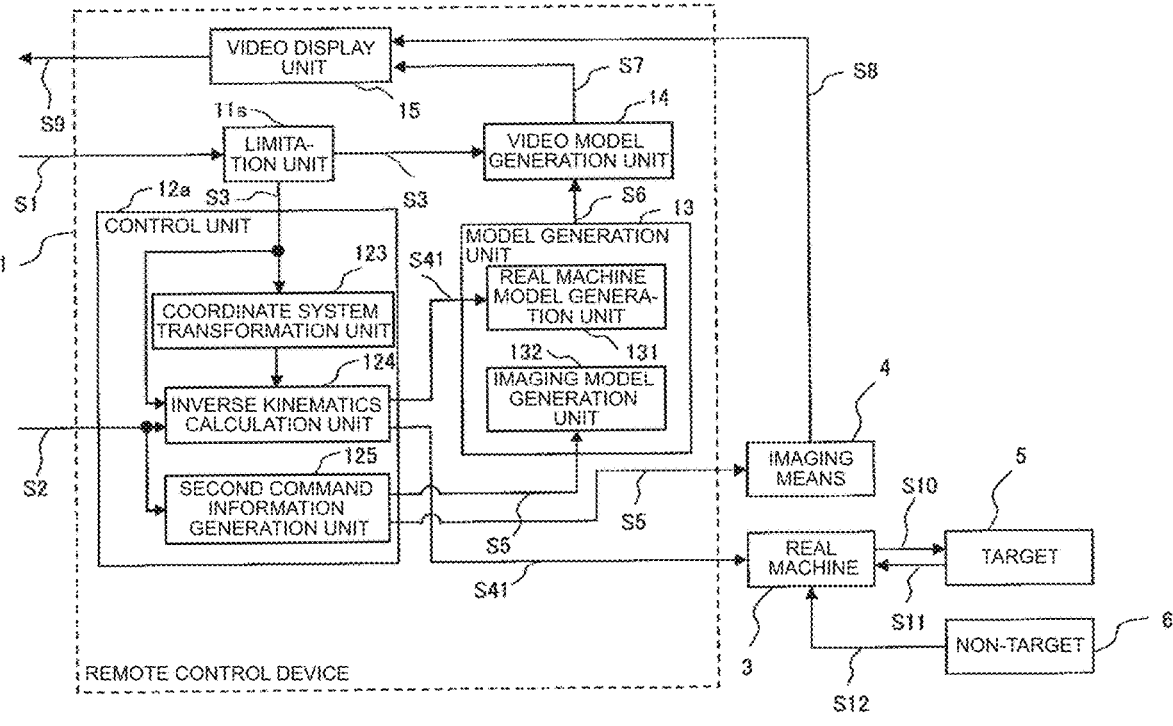
FIG. 37 is a block diagram illustrating an example of a configuration of the remote control device in a seventh embodiment.

FIG. 37 is a block diagram illustrating an example of a configuration of the remote control device 1 in a seventh embodiment.

As illustrated in FIG. 37, the remote control device 1 includes a limitation unit 11*s*, a control unit 12*a*, the model generation unit 13, the video model generation unit 14, and the video display unit 15. FIG. 37 is different from FIG. 1 in including the limitation unit 11*s* instead of the limitation unit 11, and including the control unit 12*a* instead of the control unit 12. Since the model generation unit 13, the video model generation unit 14, the video display unit 15, the real machine 3, the imaging means 4, the target 5, and the non-target 6 illustrated in FIG. 37 are the same as the model generation unit 13, the video model generation unit 14, the video display unit 15, the real machine 3, the imaging means 4, the target 5, and the non-target 6 illustrated in FIG. 1, the descriptions thereof will be omitted.

The limitation unit 11*s* receives the limitation information S1 from the operator. The limitation unit 11*s* generates the movable range S3 on the basis of the limitation information S1, and provides the movable range S3 for a coordinate system transformation unit 123 in the control unit 12*a* and the video model generation unit 14. In the present embodiment, the limitation unit 11*s* sets the movable range S3 in any spatial coordinate system including the x-y-z Cartesian coordinate system having the real machine 3 installed therein. For this reason, the limitation unit 11*s* does not physically set the movable range S3 using, for example, the x-axis translation plate 11*a* and the y-axis translation plate 11*b* illustrated in FIG. 5, but sets the movable range S3 by software processing. The software processing means that a plurality of points are set in a desired coordinate system in which to set the movable range S3, and a straight line, a curve, a plane, or a curved surface including these points is set as the movable range S3.

The control unit 12*a* includes the coordinate system transformation unit 123, an inverse kinematics calculation unit 124, and a second command information generation unit 125.

The coordinate system transformation unit 123 receives the movable range S3 from the limitation unit 11*s*. The coordinate system transformation unit 123 transforms the spatial coordinate system having the movable range S3 set, into the x-y-z Cartesian coordinate system having the real machine 3 installed. This corresponds to mapping from the spatial coordinate system having the movable range S3 set, to the x-y-z Cartesian coordinate system.

The inverse kinematics calculation unit 124 receives the control information S2 from the operator and the movable range S3 from the limitation unit 11*s*. On the basis of the control information S2 and the movable range S3, the inverse kinematics calculation unit 124 performs an inverse kinematics calculation on a plurality of points defining the movable range S3 in the x-y-z Cartesian coordinate system provided by the coordinate system transformation unit 123, and provides post-inverse-kinematics-calculation first command information S41 for the real machine 3 and the real machine model generation unit 131.

The second command information generation unit 125 receives the control information S2 from the operator. The second command information generation unit 125 generates the second command information S5 on the basis of the control information S2, and provides the second command information S5 for the imaging means 4 and the imaging model generation unit 132. Since the second command information S5 is the same as the second command information S5 in the first embodiment, the description thereof will be omitted.

The real machine 3 moves within the movable range S3 set by the limitation unit 11*s*, but, in some case, is not be physically movable. In view of this, the remote control device 1 may include a first correction unit (not illustrated)

between the control unit 12*a*, and the real machine 3 and between the control unit 12*a* and the real machine model generation unit 131. The first correction unit receives the first command information S41 from the inverse kinematics calculation unit 124, and corrects the first command information S41. The first correction unit provides the corrected first command information for the real machine 3 and the real machine model generation unit 131. For example, in a case where a range of physical motion of the real machine 3 is smaller than the movable range S3, the first command information S41 that is an input value exceeding such a range of motion could be given to the real machine 3. To address this, the first correction unit corrects the first command information S41 so that the corrected first command information S41 falls within the range of motion.

The remote control device 1 may include, instead of the first correction unit, a second correction unit (not illustrated) between the limitation unit 11*s* and the control unit 12*a* and between the limitation unit 11*s* and the video model generation unit 14. The second correction unit corrects the movable range S3 from the limitation unit 11*s*, and provides the corrected movable range for the coordinate system transformation unit 123 and the video model generation unit 14. Specifically, the second correction unit transforms the spatial coordinate system having the movable range S3 set, into the x-y-z Cartesian coordinate system, and performs the inverse kinematics calculation on a plurality of points defining the movable range S3. Subsequently, the second correction unit corrects a movable range resulting from the inverse kinematics calculation, performs a kinematics calculation on a result of that correction, and outputs a result of this kinematics calculation, as a corrected movable range to the control unit 12*a* and the video model generation unit 14. The movable range resulting from the inverse kinematics calculation and then corrected may be output as the first command information S41 to the real machine 3 and the real machine model generation unit 131, and in that case, the kinematics calculation is unnecessary. However, in a case where the video display unit 15 displays the corrected movable range, the kinematics calculation is performed.

Figure 38:
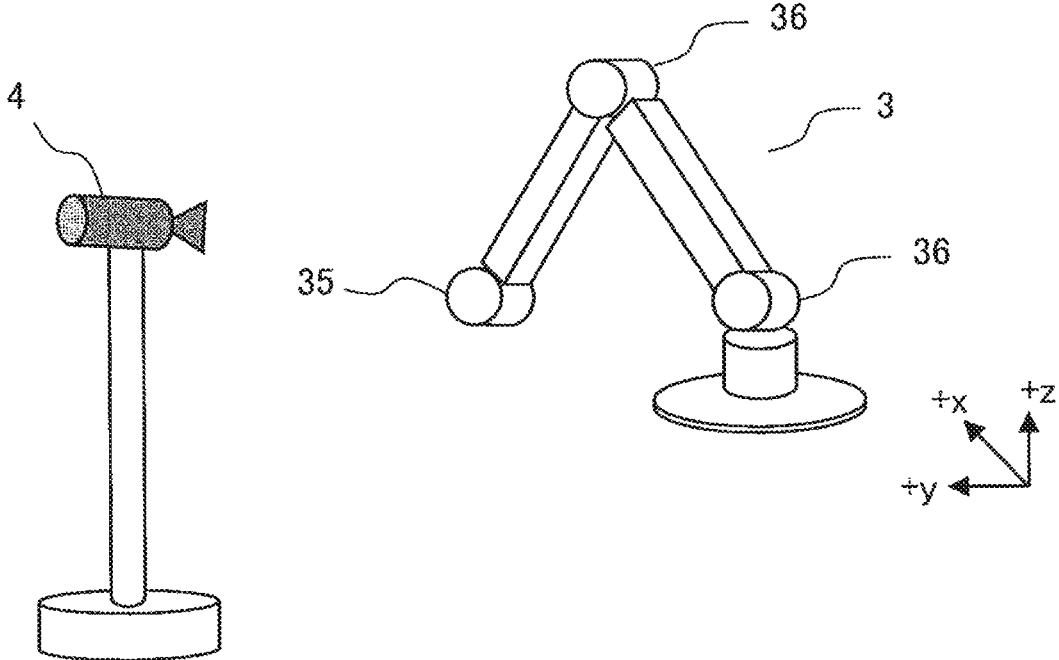
FIG. 38 is a schematic view illustrating an example of a configuration including the real machine in the seventh embodiment.

FIG. 38 is a schematic view illustrating an example of a configuration including the real machine 3 in the seventh embodiment. Since the imaging means 4 illustrated in FIG. 38 is the same as the imaging means 4 illustrated in FIG. 4, the description thereof will be omitted.

As illustrated in FIG. 38, the real machine 3 is a two-link manipulator. The two-link manipulator is a robot arm configured such that two actuators 36 rotates in accordance with the first command information S41 from the inverse kinematics calculation unit 124 to thereby determine the position of an end effector 35. In that case, the movable range S3 is set relative to the end effector 35. In FIG. 37, only the first command information S41 is input to the real machine 3 and the real machine model generation unit 131, but in a case where the real machine 3 is the two-link manipulator, two different pieces of the first command information S41 corresponding to the two actuators 36 are input thereto.

In a case where the real machine 3 is the two-link manipulator illustrated in FIG. 38, the inverse kinematics calculation unit 124 performs the inverse kinematics calculation by using a conversion formula for converting the position of the end effector 35 into the angles of the two actuators 36. Thus, the first command information S41 corresponds to the angles of the actuators 36. However, in a case where the real machine 3 is not the two-link manipulator but, for example, a six-link manipulator, or in a case where the real machine 3 is installed on a mobile carriage or the like, the conversion formula becomes complicated. In view of this, the inverse kinematics calculation unit 124 may simplify the conversion formula, for example, by linearizing the angles of the actuators 36 with respect to the position of the end effector 35, and obtain, through an optimization algorithm, a coefficient by which to multiply a variable such as the position of the end effector 35. Alternatively, the coefficient may be obtained by machine learning. The optimization algorithm is, for example, gradient descent. In a case where the remote control device 1 includes the second correction unit, the kinematics calculation performed by the second correction unit is to use a conversion formula for converting the angles of the actuators 36 into the position of the end effector 35.

The real machine 3 is not limited to the two-link manipulator.

FIGS. 39(*a*) and 39(*b*) are schematic views each illustrating an example of the video S9 on the video display unit 15 in the seventh embodiment. FIG. 39(*a*) is a schematic view of a video S91*a* on the video display unit 15 in a case where a straight line is set as the movable range S3. FIG. 39(*b*) is a schematic view of a video S91*b* on the video display unit 15 in a case where a plane is set as the movable range S3.

As illustrated in FIG. 39(*a*), the video S91*a* is a video having a real machine video S8*g* and a movable information video S7*p* superimposed on each other. The real machine video S8*g* is a video of the real machine 3 captured by the imaging means 4. The movable information video S7*p*, which is generated by the video model generation unit 14, is a video of the movable range S3.

As illustrated in FIG. 39(*b*), the video S91*b* is a video having a real machine video S8*h* and a movable information video S7*q* superimposed on each other. The real machine video S8*h* is a video of the real machine 3 captured by the imaging means 4. The movable information video S7*q*, which is generated by the video model generation unit 14, is a video of the movable range S3.

Figure 40:
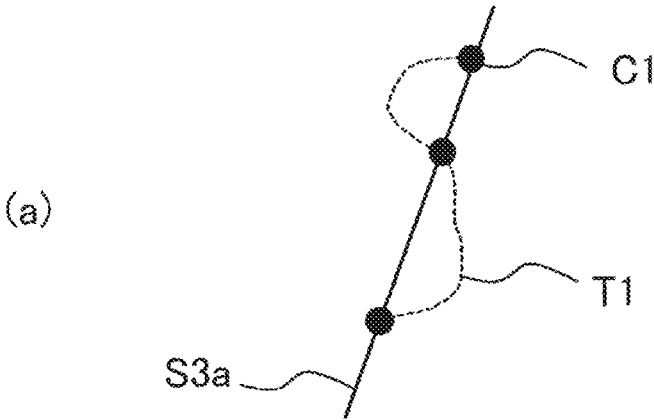
FIG. 40 is a set of schematic views each illustrating a relationship between the movable range and a motion trajectory of an end effector in the seventh embodiment.
Figure 40:
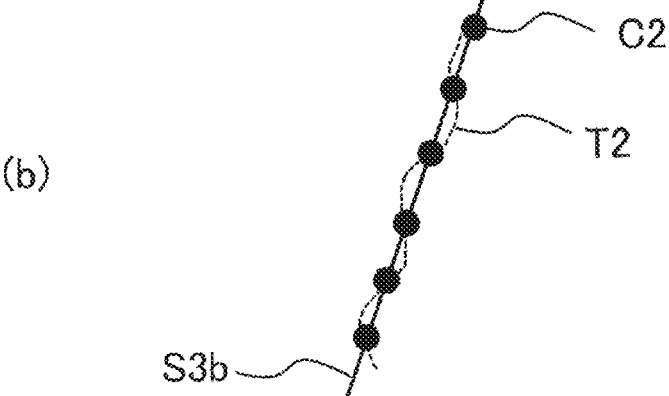

In a case where the limitation unit 11*s* sets the movable range S3 by software processing, two problems occur. A first problem is that a deviation occurs between the movable range S3 set by the limitation unit 11*s* and a motion trajectory of the end effector 35. FIGS. 40(*a*) and 40(*b*) are schematic views each illustrating a relationship between the movable range S3 and a motion trajectory of the end effector 35 in the seventh embodiment. FIG. 40(*a*) illustrates a motion trajectory T1 of the end effector 35 in a case where a movable range S3*a* is set by a plurality of points C1. FIG. 40(*b*) illustrates a motion trajectory T2 of the end effector 35 in a case where a movable range S3*b* is set by a plurality of points C2.

As illustrated in FIG. 40(*a*), in a case where the number of points C1 set per unit time is small, an interval between the points C1 becomes large, and thus a deviation occurs between the movable range S3*a* and the motion trajectory T1. This is because as the trajectory of the movable range S3 to be subjected to the inverse kinematics calculation does not necessarily coincide with the trajectory of the first command information S41, these two provide a nonlinear relationship therebetween. The first command information S41 is command information directed to the actuators 36, and the trajectory thereof is a rotation trajectory. On the other hand, the trajectory of the movable range S3 is not limited to the rotation trajectory, and may take any trajectory.

Examples of a solution thereto include, as illustrated in FIG. 40(*b*), increasing the number of points C2 set per unit time. However, if the number thereof is too large, a calculation load increases, and it is therefore desirable to set the points C2, taking into consideration a balance between the number of the points and the calculation load. The examples further include a method of locally setting the points C1 illustrated in FIG. 40(*a*) without changing the number of these points. This corresponds to reducing a moving speed of the end effector 35. The examples further include setting the movable range S3 so that the motion of the end effector 35 becomes the same rotational motion as that of the actuators 36.

In each of the first to sixth embodiments, the real machine 3 includes the x-axis translation mechanism 31, the y-axis translation mechanism 32, and the z-axis translation mechanism 33. For this reason, even when the number of points set per unit time is small, no deviation occurs between the movable range S3 and the motion trajectory. This is because, for example, in a case where the movable range S3 is set to that in the x-axis, the trajectory of the first command information S4 becomes the x-axis and thus coincides with the trajectory of the movable range S3, such that these two provide a linear relationship therebetween.

A second problem is that the first command information S41 becomes discontinuous at a time of switching between free motion in which the movable range S3 is not set and constrained motion in which the movable range S3 is set. In the case of free motion, the real machine 3 moves in the x-y-z Cartesian coordinate system. In the case of constrained motion, on the other hand, transformation into the spatial coordinate system having the movable range S3 set is once performed, after which transformation into the x-y-z Cartesian coordinate system is performed. When the transformation into the spatial coordinate system having the movable range S3 set is performed, the first command information S41 becomes discontinuous. As a result, an abrupt change in a command value is requested from each of the actuators 36, and thus the actuators 36 may be damaged.

Examples of a solution thereto include switching the free motion to the constrained motion after moving the end effector 35 to a position where a change in the command value for each of the actuators 36 is reduced within a first predetermined range. The first predetermined range is, for example, a range in which a current flowing through each of the actuators 36 is equal to or less than a predetermined value. Alternatively, the first predetermined range is a range in which there occurs no collision with a surrounding environment such as a device, or a person. The examples further include generating the first command information S41 by selecting a point from a plurality of points such that a distance between the selected point and a coordinate point of the end effector 35 immediately before the free motion is switched to the constrained motion falls within a second predetermined range and the end effector 35 moves to the selected point immediately after that switching. The second predetermined range may be the same as or different from the first predetermined range. The plurality of points are a plurality of points defining the movable range S3. The examples further include setting the movable range S3 so that the spatial coordinate system having the movable range S3 set is the x-y-z Cartesian coordinate system. This results in no occurrence of transformation of the coordinate system. The examples further include remote operation in the constrained motion alone, instead of the remote operation of the real machine 3 in two motion patterns, i.e., the free motion and the constrained motion.

Figure 41:
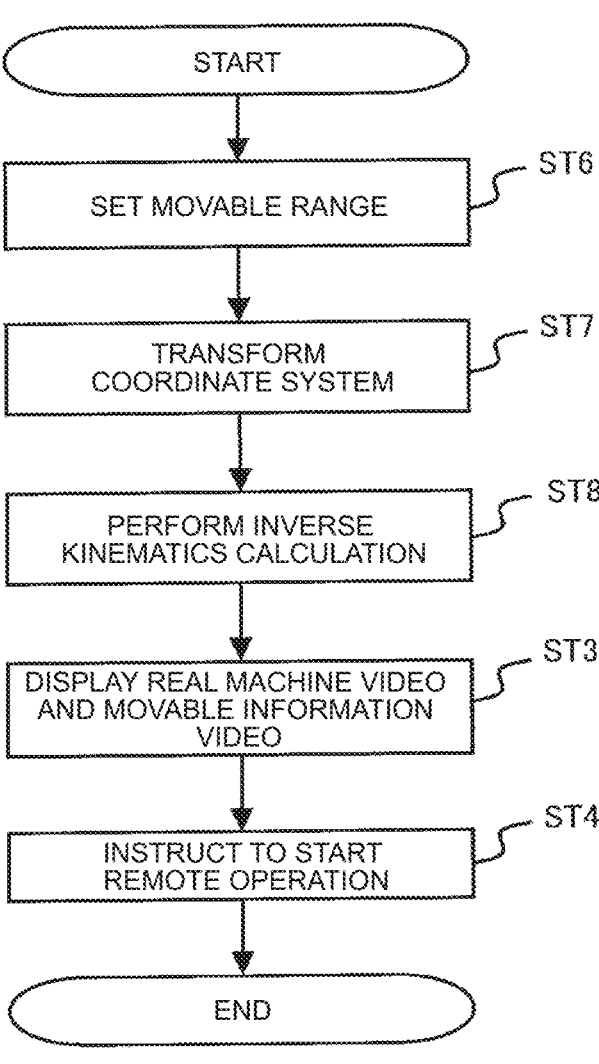
FIG. 41 is a flowchart illustrating an example of an operation of the remote control device in the seventh embodiment.

FIG. 41 is a flowchart illustrating an example of an operation of the remote control device 1 in the seventh embodiment.

As illustrated in FIG. 41, when the remote control device 1 is started up by the means not illustrated, the limitation unit 11*s* sets the movable range S3 of the real machine 3 on the basis of the limitation information S1 from the operator (step ST6). The limitation unit 11*s* sets the movable range S3 by software processing.

The coordinate system transformation unit 123 transforms the spatial coordinate system having the movable range S3 set, into the x-y-z Cartesian coordinate system (step ST7).

The inverse kinematics calculation unit 124 performs the inverse kinematics calculation on a plurality of points defining the movable range S3 in the x-y-z Cartesian coordinate system provided by the coordinate system transformation unit 123, and provides the post-inverse-kinematics-calculation first command information S41 for the real machine 3 and the real machine model generation unit 131 (step ST8).

The video display unit 15 displays the real machine video S8 from the imaging means 4 and the movable information video S7 from the video model generation unit 14 (step ST3).

The means not illustrated instructs the operator to start remote operation (step ST4). The operator remotely controls the real machine 3, checking the real machine video S8 and the movable information video S7 displayed by the video display unit 15. The means not illustrated stops the remote control device 1 when receiving, from the operator, an instruction to end the remote operation.

According to the seventh embodiment described above, since the limitation unit 11*s* sets the movable range S3 by software processing, the movable range S3 can be set in any spatial coordinate system.

In each of the first to sixth embodiments, the movable range S3 of the real machine 3 is set in the x-axis direction, the y-axis direction, or any direction on the xy plane, but may be set in the z-axis direction, any direction on a yz plane, or any direction on an xz plane. In addition, the movable range S3 may be set on any plane.

In addition, in each of the first to seventh embodiments, a head-mounted display may be used as the video display unit 15 or 15*a*, and the operator may wear the head-mounted display and remotely control the real machine 3, checking the video S9.

Furthermore, in each of the first to seventh embodiments, contact of the real machine end 34, the manipulator 9, or the end effector 35 with the target 5 may be presented to the operator by a means not illustrated. For example, a tactile sensor is attached to the real machine end 34, the manipulator 9, or the end effector 35. After confirming the contact with the target 5, the operator does not necessarily need to operate the real machine, checking the real machine video S8 or S81. As a result, it is possible to provide a period during which the imaging means 4 is in an image-capturing OFF state. This makes it possible to decrease a memory capacity of the imaging means 4, and reduce a load of communication between the remote control device 1 and the imaging means 4.

REFERENCE SIGNS LIST

1 remote control device; 3 real machine; 4, 41 to 44 imaging means; 5 target; 6 non-target; 7 movable range forming means; 8 drive device; 9 manipulator; 11, 11*m* to 11*p*, 11*s* limitation unit; 11*a* x-axis translation plate; 11*b* y-axis translation plate; 11*c* x-axis restriction button; 11*d* y-axis restriction button; 11*e* to 11*j*, 11*q*, 11*r* limitation pattern; 11*k*, 11*ma* to 11*pa*, 11*s* cursor; 11*mb* to 11*pb* OK button; 11*mc* to 11*pc* CANCEL button;

11*md* to 11*mg*, 11*nd* to 11*ng*, 11*od* to 11*og*, 11*pd* to 11*pg* constraint point; 12, 12*a* control unit; 123 coordinate system transformation unit; 124 inverse kinematics calculation unit; 125 second command information generation unit; 13 model generation unit; 14, 14*a* video model generation unit; 15, 15*a* video display unit; 31 x-axis translation mechanism; 32 y-axis translation mechanism; 33 z-axis translation mechanism; 34 real machine end; 35 end effector; 36 actuator; 71 laser light source; 72 laser beam; 73 multi laser light source; 74 multi laser beam; 121 control stick; 122 button; 131 real machine model generation unit; 132 imaging model generation unit; 133 light source model generation unit; 134 drive model generation unit; 135 manipulator model generation unit; S1 limitation information; S2 control information; S3, S3*a*, S3*b* movable range; S4, S41 first command information; S5, S51 to S54 second command information; S13 third command information; S14 fourth command information; S16 fifth command information; S19 sixth command information; S6 model information; S7, S7*a* to S7*k*, S7*m* to S7*q*, S15, S15*a*, S15*b*, S20, S20*a* to S20*d* movable information video; S8, S81, S8*a* to S8*h* real machine video; S9, S9*a* to S9*k*, S9*m* to S9*z*, S91*a*, S91*b* video; S10 action force; S11, S12 reaction force; S17 openable/closable range; S18 posture restriction range; C1, C2 point constituting movable range; T1, T2 motion trajectory.

The invention claimed is:

1. A remote control device which an operator uses in remotely controlling a real machine, the remote control device comprising:

circuitry configured to:

set a movable range of the real machine on a basis of limitation information from the operator;

display a real machine video and a movable information video, the real machine video being a video of the real machine and the movable information video being a video of the movable range; and using control information from the operator who has watched the real machine video and the movable information video and using the movable range of the real machine set on the basis of the limitation information, generate first command information for controlling the real machine within the movable range set on the basis of the limitation information without an operable range for the operator being physically limited.

2. The remote control device according to claim 1, wherein the movable information video is generated on a basis of model information and the movable range, the model information is a combination of a real machine model and an imaging model, the real machine model is generated using the first command information, and the imaging model is generated using second command information for operating a camera.

3. The remote control device according to claim 2, wherein the model information is combined with a model of a light source, and the model of the light source is generated using third command information for operating the light source.

4. The remote control device according to claim 2, wherein the model information is combined with a model of a drive device, and the model of the drive device is generated using fifth command information for operating the drive device.

5. The remote control device according to claim 2, wherein the model information is combined with a model of a manipulator connected to the real machine, and the model of the manipulator is generated using sixth command information for operating the manipulator.

6. A remote control device which an operator uses in remotely controlling a real machine, the remote control device comprising:

a limiter to set a movable range of the real machine on a basis of limitation information from the operator;

a video display to display a real machine video and a movable information video, the real machine video being a video of the real machine and the movable information video being a video of the movable range; and a controller to, using control information from the operator who has watched the real machine video and the movable information video displayed on the video display and using the movable range of the real machine set on the basis of the limitation information, generate first command information for controlling the real machine within the movable range set on the basis of the limitation information without an operable range for the operator being physically limited.

7. The remote control device according to claim 1, wherein the real machine video and the movable information video are displayed in a superimposed manner.

8. The remote control device according to claim 6, wherein the real machine video and the movable information video are displayed in a superimposed manner.

9. The remote control device according to claim 6, wherein the movable information video is generated on a basis of model information and the movable range, the model information is a combination of a real machine model and an imaging model, the real machine model is generated using the first command information, and the imaging model is generated using second command information for operating a camera.

10. The remote control device according to claim 9, wherein the model information is combined with a model of a light source, and the model of the light source is generated using third command information for operating the light source.

11. The remote control device according to claim 9, wherein the model information is combined with a model of a drive device, and the model of the drive device is generated using fifth command information for operating the drive device.

12. The remote control device according to claim 9, wherein the model information is combined with a model of a manipulator connected to the real machine, and the model of the manipulator is generated using sixth command information for operating the manipulator.

13. The remote control device according to claim 12, wherein the limiter sets an openable/closable range of the manipulator on a basis of limitation information from the operator.

14. The remote control device according to claim 12, wherein the limiter sets a posture restriction range of the manipulator on a basis of limitation information from the operator.

15. The remote control device according to claim 6, wherein the controller includes:

a coordinate system transformer to transform a spatial coordinate system having the movable range set into a coordinate system having the real machine installed; and an inverse kinematics calculator to perform an inverse kinematics calculation on a plurality of points defining the movable range in the coordinate system having been subjected to the transformation, and to output a result of the calculation as the first command information.

16. The remote control device according to claim 6, wherein the real machine video is a video of the real machine captured by at least one of a plurality of cameras, and the controller generates command information for the plurality of cameras so as to enable the at least one of the plurality of cameras.

17. The remote control device according to claim 2, wherein the camera includes an infrared camera.

18. The remote control device according to claim 9, wherein the camera includes an infrared camera.

19. The remote control device according to claim 16, wherein the plurality of cameras includes a plurality of infrared cameras.

* * * * *